US012798234B2

(12) United States Patent
Sato et al.

(10) Patent No.: US 12,798,234 B2
(45) Date of Patent: Nov. 17, 2026

(54) PRINTING APPARATUS, INFORMATION PROCESSING METHOD, AND STORAGE MEDIUM

(71) Applicant: CANON KABUSHIKI KAISHA, Tokyo (JP)

(72) Inventors: Kohei Sato, Kanagawa (JP); Yuhei Oikawa, Kanagawa (JP); Kazuki Takahashi, Tokyo (JP); Atsuhiko Masuyama, Kanagawa (JP); Kyosuke Deguchi, Kanagawa (JP); Takafumi Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 18/814,790

(22) Filed: Aug. 26, 2024

(65) Prior Publication Data

US 2025/0074053 A1 Mar. 6, 2025

(30) Foreign Application Priority Data

Aug. 30, 2023 (JP) ................................. 2023-139530

(51) Int. Cl.
*B41J 2/045* (2006.01)
*B41J 2/14* (2006.01)
*B41J 2/175* (2006.01)
*B41J 2/18* (2006.01)

(52) U.S. Cl.
CPC ......... *B41J 2/04563* (2013.01); *B41J 2/0454* (2013.01); *B41J 2/04553* (2013.01); *B41J 2/0458* (2013.01); *B41J 2/14153* (2013.01); *B41J 2/175* (2013.01); *B41J 2/18* (2013.01)

(58) Field of Classification Search
CPC .. B41J 2/04563; B41J 2/0454; B41J 2/04553; B41J 2/0458; B41J 2/14153; B41J 2/175; B41J 2/18
See application file for complete search history.

(56) References Cited

U.S. PATENT DOCUMENTS

| | | | |
|---|---|---|---|
| 7,287,830 | B2 | 10/2007 | Ide |
| 7,303,247 | B2 | 12/2007 | Maru |
| 7,328,963 | B2 | 2/2008 | Tajika |
| 7,891,796 | B2 | 2/2011 | Masuyama |
| 8,205,982 | B2 | 6/2012 | Masuyama |

(Continued)

FOREIGN PATENT DOCUMENTS

| | | | |
|---|---|---|---|
| JP | 2019-104185 | A | 6/2019 |

*Primary Examiner* — Justin Seo
(74) *Attorney, Agent, or Firm* — Venable LLP

(57) ABSTRACT

A technology capable of accurately obtaining a calibration value for calibrating a detected temperature from a temperature sensor installed in a print head is to be provided. A printing apparatus includes: a printing unit configured to perform printing onto a print medium; a supply unit configured to supply ink to the printing unit; a first detection unit configured to detect a temperature of the ink to be supplied to the printing unit; a second detection unit configured to detect a temperature of the printing unit; and an obtainment unit configured to obtain a calibration value based on a value obtained by subtracting a second detected temperature from the second detection unit from a first detected temperature from the first detection unit of the ink upstream of the printing unit, the calibration value being obtained for calibrating the second detected temperature.

16 Claims, 14 Drawing Sheets

(56) References Cited

U.S. PATENT DOCUMENTS

| | | | | |
|---|---|---|---|---|
| 8,864,266 | B2 | 10/2014 | Suzuki | |
| 8,979,238 | B2 | 3/2015 | Nishikori | |
| 9,016,821 | B2 | 4/2015 | Masuda | |
| 9,108,403 | B2 | 8/2015 | Kawatoko | |
| 9,114,607 | B2 | 8/2015 | Ishii | |
| 9,174,436 | B2 | 11/2015 | Suzuki | |
| 9,764,562 | B2 | 9/2017 | Suzuki | |
| 10,239,330 | B2 | 3/2019 | Ohnishi | |
| 10,556,448 | B2 | 2/2020 | Ohnishi | |
| 10,668,717 | B2 | 6/2020 | Azuma | |
| 10,766,251 | B2 | 9/2020 | Oikawa | |
| 10,836,155 | B2 | 11/2020 | Chikuma | |
| 10,875,297 | B2 | 12/2020 | Kano | |
| 11,097,535 | B2 | 8/2021 | Oikawa | |
| 11,192,357 | B2 | 12/2021 | Oikawa | |
| 11,298,937 | B2 | 4/2022 | Oikawa | |
| 11,351,774 | B2 | 6/2022 | Oikawa | |
| 11,691,415 | B2 | 7/2023 | Oikawa | |
| 11,820,136 | B2 | 11/2023 | Oikawa | |
| 2010/0238226 | A1* | 9/2010 | Tanaka | B41J 2/04563 347/17 |
| 2011/0221820 | A1* | 9/2011 | Shibata | B41J 29/38 347/17 |
| 2019/0176467 | A1 | 6/2019 | Azuma | |
| 2020/0316933 | A1* | 10/2020 | Suematsu | B41J 2/04598 |
| 2024/0017558 | A1 | 1/2024 | Sato | |
| 2024/0278569 | A1 | 8/2024 | Oikawa | |

* cited by examiner

| | HEAD TEMPERATURE SENSOR CLOSE TO THE INK INLET PORT | HEAD TEMPERATURE SENSOR FAR FROM THE INK INLET PORT |
|---|---|---|
| PROPORTIONALITY COEFFICIENT A | 0.1 | 0.5 |

FIG.14

PRINTING APPARATUS, INFORMATION PROCESSING METHOD, AND STORAGE MEDIUM

BACKGROUND OF THE INVENTION

Field of the Invention

The present invention relates to a printing apparatus, an information processing method, and a storage medium.

Description of the Related Art

In inkjet printing apparatuses, the print head is controlled based on the temperature of the print head that ejects ink. Such print heads are equipped with a diode sensor as a temperature sensor for detecting the temperature. It should be noted that the diode sensor has a large offset error. Therefore, the detected temperature from the diode sensor is generally calibrated based on the environmental temperature and the like detected by a temperature sensor such as a thermistor.

Specifically, a calibration value is to be obtained to calibrate the detected temperature, and this calibration value is obtained based on the temperature of the print head and the environmental temperature. Therefore, in a case of obtaining a calibration value, it is assumed that the temperature of the print head and the environmental temperature are about the same. However, for example, in a case where a print head that has just been taken out from a car under blazing sunlight or a warehouse in a cold condition is mounted in a printing apparatus at room temperature, it is not possible to properly obtain the calibration values.

In Japanese Patent Laid-Open No. 2019-104185, a technology is disclosed for promptly obtaining a calibration value to calibrate the detected temperature from a temperature sensor installed in a print head, even if the temperature of the print head differs from the environmental temperature. Specifically, in the technology disclosed in Japanese Patent Laid-Open No. 2019-104185, during the filling of ink into the print head, a temperature to be detected by the temperature sensor in the print head as the temperature of the print head approaches the environmental temperature is estimated, and the calibration value is obtained based on the estimated temperature.

However, the technology disclosed in Japanese Patent Laid-Open No. 2019-104185 does not take into consideration the temperature of the ink to be filled into the print head. For this reason, in a case where the temperature of the ink being filled differs from the environmental temperature or the like, it is not possible to accurately estimate the detected temperature as the print head approaches the environmental temperature, and thus the calibration value cannot be accurately obtained.

SUMMARY OF THE INVENTION

The present invention was made in view of the above-mentioned issues, and provides a technology capable of accurately obtaining a calibration value for calibrating a detected temperature from a temperature sensor installed in a print head.

A printing apparatus includes: a printing unit configured to perform printing onto a print medium; a supply unit configured to supply ink to the printing unit; a first detection unit configured to detect a temperature of the ink to be supplied to the printing unit; a second detection unit configured to detect a temperature of the printing unit; and an obtainment unit configured to obtain a first calibration value based on a value obtained by subtracting a second detected temperature from the second detection unit from a first detected temperature from the first detection unit of the ink upstream of the printing unit, the first calibration value being obtained for calibrating the second detected temperature.

According to the present invention, it is possible to accurately obtain a calibration value for calibrating a detected temperature from a temperature sensor installed in a print head.

Further features of the present invention will become apparent from the following description of exemplary embodiments with reference to the attached drawings.

BRIEF DESCRIPTION OF THE DRAWINGS

FIG. 14 is a table illustrating the relationship between a proportionality coefficient and the positions of the ink temperature sensor.

DESCRIPTION OF THE EMBODIMENTS

Hereinafter, with reference to the accompanying drawings, a detailed explanation is given of examples of an embodiment of the printing apparatus, the information processing method, and the storage medium. Note that the following embodiments are not intended to limit the present invention, and every combination of the characteristics explained in the present embodiments is not necessarily essential to the units that define the present invention. Further, the positions, shapes, etc., of the constituent elements described in the present embodiments are merely examples and are not intended to limit this invention to the range of the examples.

In the present specification, an embodiment in which only ink is ejected as the printing agent in the printing apparatus is described, but the printing agents that can be ejected by the printing apparatus are not limited to ink. The printing agents include various known printing agents used for printing, such as a treatment liquid that applies a predetermined treatment to the ejected ink.

In the present specification, "printing" refers not only to cases of the formation of meaningful information such as characters and figures, that is, being meaningful or meaningless does not matter. Further, whether or not being elicited in such a manner that a human can visually perceive does not matter either, and a case of forming an image, a design, a pattern, or the like on a print medium in a broad sense or a case of processing a medium are also included. The "print medium" in the present specification includes not only paper used in a general printing apparatus, but also cloth, plastic film, a metal plate, glass, resin, wood, leather, and the like that can accept the printing agent that is used.

In the present specification, unless otherwise specified, the "nozzles" refer to ejection ports that eject ink and the flow paths in communication therewith, and the "printing elements" refer to elements installed corresponding to the ejection ports to generate energy utilized in the ejection of ink. The printing elements are installed, for example, in positions facing the ejection ports. Further, in the present specification, the "element substrate for the print head" refers not only to a mere substrate made of silicon semiconductors, but also to a substrate on which each element, wiring line, etc., are installed. Moreover, "on the substrate" refers not only to the top of the element substrate, but also includes the surfaces of the element substrate and the inside of the element substrate in the vicinity of the surfaces.

First Embodiment

First, with reference to FIG. 1 to FIG. 8, an explanation is given about the printing apparatus according to the first embodiment.

<Printing Apparatus>

Figure 1:
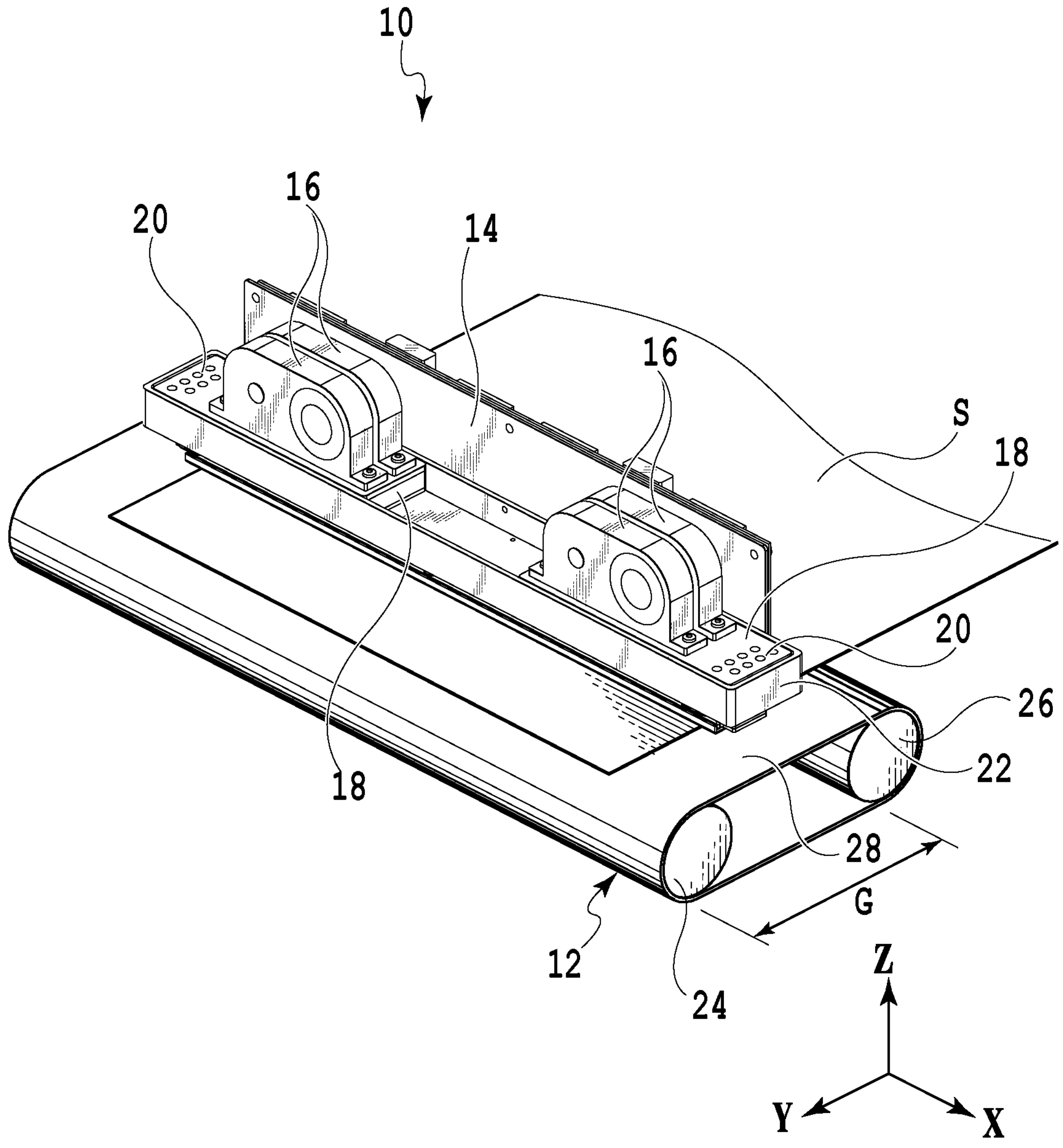
FIG. 1 is an oblique configuration diagram of a configuration that implements a printing function of a printing apparatus.

FIG. 1 is a perspective view of the configuration that implements the printing function of the printing apparatus. In the present embodiment, an explanation is given using a multifunction peripheral equipped with a printing function and a reading function as an example of the printing apparatus. However, in FIG. 1, only the configuration that implements the printing function is illustrated for ease of understanding. Various known technologies can be used for the configuration to implement the reading function.

The printing apparatus 10 is equipped with the conveyance part 12 that conveys the print medium S in the Y direction, and the print head 14 that extends in the X direction which intersects (orthogonally in the present embodiment) the Y direction and ejects ink onto the print medium S conveyed by the conveyance part 12. The printing apparatus 10 is a full-line type printing apparatus that performs continuous printing while continuously or intermittently conveying a plurality of the print medium S. Note that the print medium S may be a cut sheet or a continuous roll sheet.

The print head 14 has nozzle arrays formed with multiple nozzles capable of ejecting ink along the X direction, which intersects the Y direction that is the conveyance direction of the print medium S, on a nozzle surface that faces the conveyed print medium S. Further, the print head 14 is equipped with the negative pressure control unit 16 that controls the pressure (the negative pressure) inside the ink channel, the liquid common flow path 18 that is in communication with the negative pressure control unit 16, and the liquid connecting parts 20 that serve as the supplying port and the discharging port of the ink to the liquid common flow path 18. The negative pressure control unit 16, the liquid common flow path 18, and the liquid connecting parts 20 are installed in the housing 22.

Figure 3:
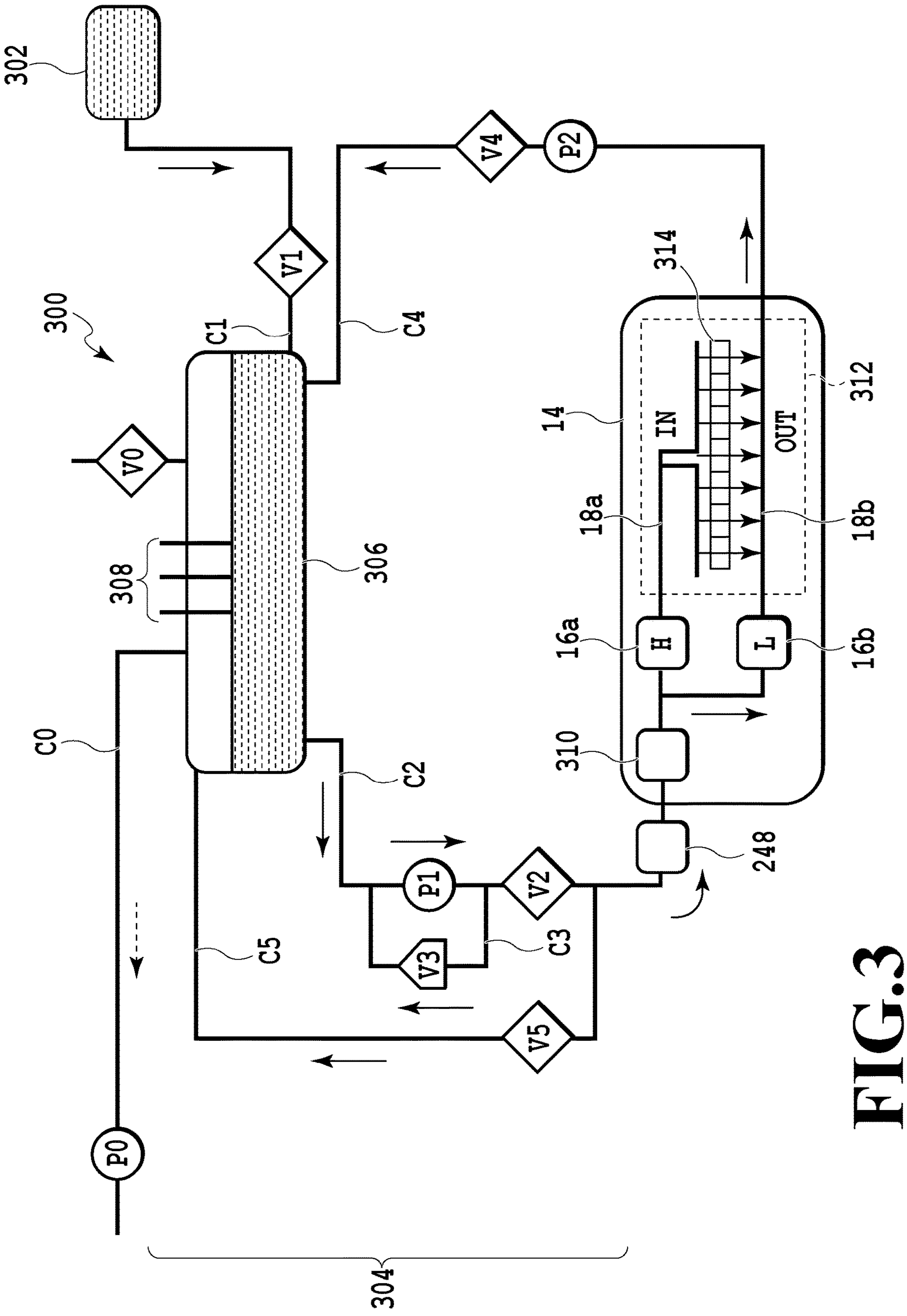
FIG. 3 is a schematic configuration diagram of a circulation path.

In the print head 14, the ink supplied into the print head 14 from one of the liquid connecting parts 20 is supplied to the ink channel inside the housing 22 via the negative pressure control unit 16 and the liquid common flow path 18 to the later-described element substrate 314 (see FIG. 3). Further, the ink discharged from the element substrate 314 is transferred via the ink channel to the liquid common flow path 18 and then discharged from the other liquid connecting part 20.

The printing apparatus 10 is configured to be able to perform printing in full color with black (K) ink, cyan (C) ink, magenta (M) ink, and yellow (Y) ink. Accordingly, the nozzle arrays corresponding to the respective inks are formed on the nozzle surface of the print head 14. The printing apparatus 10 is equipped with the main tank 302 (see FIG. 3) that independently stores each of the inks. Additionally, the main tank 302 is connected to the liquid connecting part 20 of the print head 14 via the ink supply unit 304 (see FIG. 3).

The print head 14 is electrically connected to the electric control part (not illustrated in the drawings) that communicates power and control signals to the print head 14. In the present embodiment, the print head 14 is configured to eject ink using an inkjet system that utilizes thermal energy. Accordingly, each nozzle in the print head 14 is equipped with an electrothermal conversion element (a heater) as a printing element. A pulse voltage is applied to the electrothermal conversion element according to a control signal output from the electric control part. This causes film boiling in the ink in the vicinity of the electrothermal conversion element, and the growth energy of the bubbles generated causes the ink to be ejected from the nozzle. Thus, in the present embodiment, the print head 14 functions as the printing part (the ejecting part) that ejects ink onto a print medium.

The conveyance part 12 is equipped with the two conveyance rollers 24 and 26 arranged at a distance of the interval G in the Y direction, and the belt 28 stretched endlessly between the conveyance rollers 24 and 26. The print medium S is placed on the belt 28 and conveyed. Note that the conveyance mechanism of the print medium in the conveyance part 12 is not limited to a configuration using the conveyance rollers 24 and 26 and the belt 28. For example, there may be a configuration in which the print medium is conveyed by a pair of rollers installed on the upstream side and the downstream side of the print head 14 in the conveyance direction to nip the print medium, and various known technologies can be used as the conveyance mechanism.

<Configuration of the Control System of the Printing Apparatus>

Figure 2:
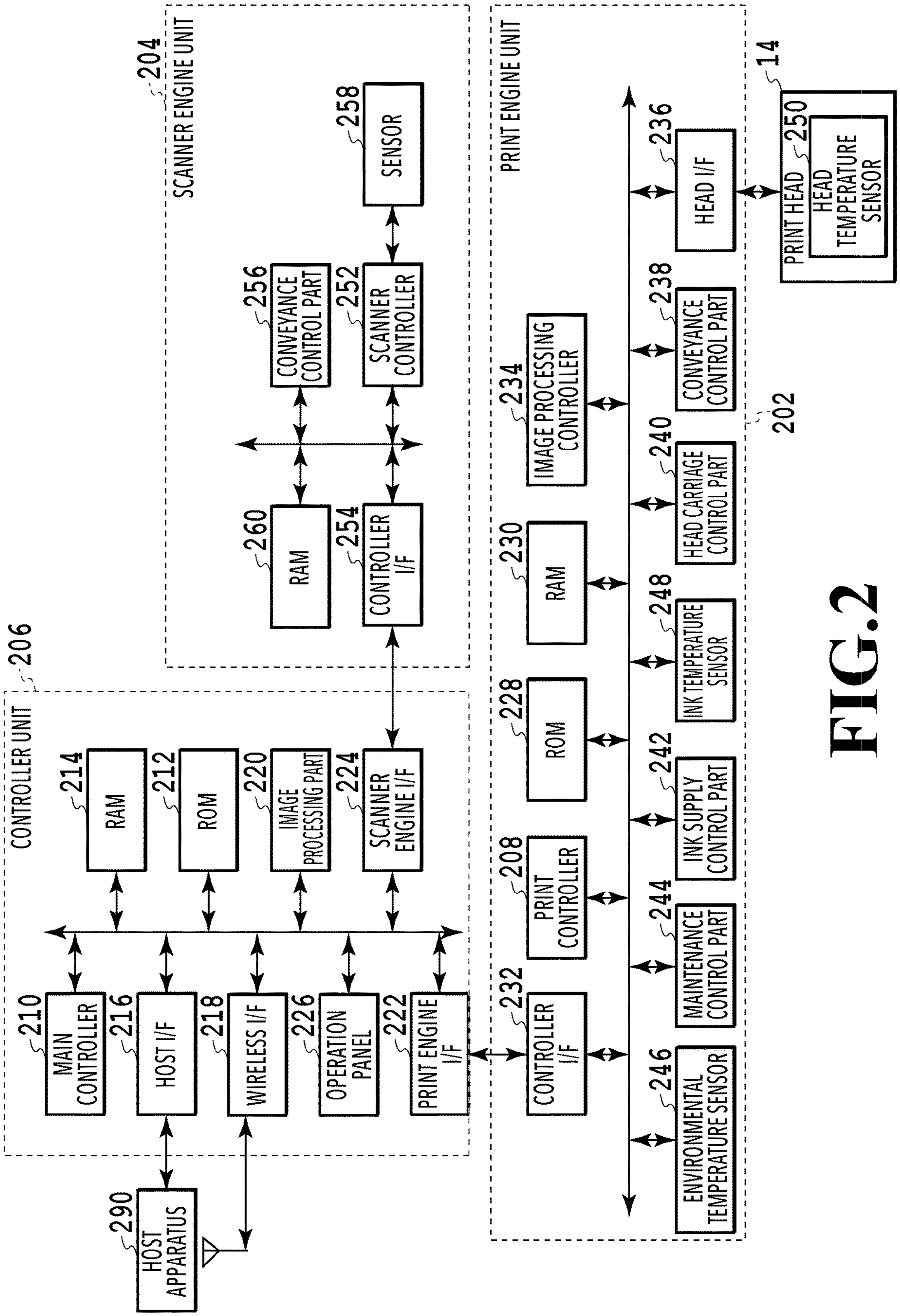
FIG. 2 is a block diagram illustrating a configuration of a control system of the printing apparatus.

Next, an explanation is given about the configuration of the control system of the printing apparatus 10. FIG. 2 is a block diagram illustrating the configuration of the control system of the printing apparatus 10. The printing apparatus 10 is equipped with the print engine unit 202 that mainly controls the operation of the configurations related to the printing function, the scanner engine unit 204 that controls the configurations related to the reading function, and the controller unit 206 that controls the overall operation of the printing apparatus 10. The print engine unit 202 is equipped with the print controller 208 with a built-in MPU and a non-volatile memory (EEPROM or the like). The print controller 208 controls various mechanisms of the print engine unit 202 in accordance with instructions from the main controller 210 of the controller unit 206. Various mechanisms of the scanner engine unit 204 are controlled by the main controller 210 of the controller unit 206.

=Controller Unit=

In the controller unit 206, the main controller 210, which is configured with a CPU, controls the entire printing apparatus 10 by using the RAM 214 as a work area in accordance with various parameters and a program stored in the ROM 212. For example, in a case where a print job is input from the host apparatus 290 via the host I/F 216 or the wireless I/F 218, the image processing part 220 performs predetermined image processing on received image data in accordance with instructions from the main controller 210. Then, the main controller 210 sends the image data, on which the image processing has been performed, to the print engine unit 202 via the print engine I/F 222.

Note that the printing apparatus 10 may obtain image data from the host apparatus 290 via a wireless communication or a wired communication or may be made to obtain image data from an external storage (such as a USB memory) connected to the printing apparatus 10. There is no limitation on the communication method utilized for the wireless communication or the wired communication. For example, Wi-Fi (registered trademark), Bluetooth (registered trademark), or the like is applicable as the communication method utilized for the wireless communication. Further, a USB or the like is applicable as the communication method utilized for the wired communication. Furthermore, for example, in a case where a read command is input from the host apparatus 290, the main controller 210 sends the read command to the scanner engine unit 204 via the scanner engine I/F 224.

The operation panel 226 is a unit for the user to perform an input or output operation for the printing apparatus 10. Via the operation panel 226, the user can provide an instruction for an operation such as copying or scanning, set a print mode, recognize information about the printing apparatus 10, etc.

=Print Engine Unit=

In the print engine unit 202, the print controller 208, which is configured with a CPU, controls various mechanisms installed in the print engine unit 202 using the RAM 230 as a work area in accordance with various parameters and a program stored in the ROM 228.

Once each kind of command and image data are received via the controller I/F 232, the print controller 208 temporarily saves the command and image data in the RAM 230. The print controller 208 causes the image processing controller 234 to convert the saved image data into print data, so as to be utilized by the print head 14 for a printing operation. After the print data is generated, the print controller 208 causes the print head 14 via the head I/F 236 to execute a printing operation based on the print data. At this time, the print controller 208 drives the conveyance rollers 24 and 26 (see FIG. 1) via the conveyance control part 238 to convey the print medium S. The printing operation by the print head 14 is executed in synchronization with the conveyance operation of the print medium S in accordance with an instruction from the print controller 208, such that the print processing is performed.

The head carriage control part 240 changes the orientation and position of the print head 14 in accordance with operating statuses of the printing apparatus 10 such as a maintenance status and a printing status. The ink supply control part 242 controls the ink supply unit 304 such that the pressure of the ink supplied to the print head 14 is controlled within a suitable range. The maintenance control part 244 controls operations of the cap unit and the wiping unit in the maintenance unit (not illustrated in the drawings) in a case of performing a maintenance operation for the print head 14.

The environmental temperature sensor 246 detects the temperature of the environment in which the print head 14 is positioned, i.e., the temperature of the surrounding area of the print head 14. The ink temperature sensor 248 is installed in the flow path that supplies the ink to the print head 14 and detects the temperature of the ink flowing in that flow path. The ink temperature sensor 248 and the environmental temperature sensor 246 are temperature detecting elements for which, for example, thermistors are used. Note that the ink temperature sensor 248 and the environmental temperature sensor 246 are higher precision sensors than the head temperature sensor 250. Based on the temperature information detected by the environmental temperature sensor 246, the ink temperature sensor 248, and the head temperature sensor 250 (described later) installed in the print head 14, the print controller 208 executes control of each configuration as appropriate. In the present embodiment, the environmental temperature sensor 246 functions as a detection part to detect the environmental temperature, and the ink temperature sensor 248 functions as a detection part to detect the temperature of the ink filled in (supplied to) the print head 14.

=Scanner Engine Unit=

In the scanner engine unit 204, the main controller 210 controls hardware resources of the scanner controller 252 using the RAM 214 as a work area in accordance with various parameters and a program stored in the ROM 212. Accordingly, the reading mechanism of the printing apparatus 10 is controlled. For example, the main controller 210 controls hardware resources of the scanner controller 252 via the controller I/F 254 so that a document loaded on the ADF (not illustrated in the drawings) by the user is conveyed via the conveyance control part 256 and read by the sensor 258. Then, the scanner controller 252 saves the read image data in the RAM 260. Note that the print engine unit 202 receives image data read by the reading mechanism and converts the image data into print data, thereby allowing the print head 14 to execute a printing operation based on the image data read by the reading mechanism.

<Ink Supply Mechanism>

Next, an explanation is given about the ink supply mechanism for supplying ink to the print head 14 and collecting ink from the print head 14 in the printing apparatus 10. FIG. 3 is a schematic diagram illustrating the circulation paths that form the ink supply mechanism in the printing apparatus 10.

As described above, in the printing apparatus 10, the print head 14, which ejects ink, and the main tank 302, which stores ink to be supplied to the print head 14, are connected via the ink supply unit 304. The ink supply unit 304 supplies ink stored in the main tank 302 to the print head 14. Note that the printing apparatus 10 is configured to eject four inks that differ from one another. For this reason, in the printing apparatus 10, the configuration illustrated in FIG. 3 is provided for each type of ink. The ink supply unit 304 is basically controlled by the ink supply control part 242.

In the printing apparatus 10, the main tank 302, the ink supply unit 304, and the print head 14 form the circulation path 300 that allows the ink to circulate between the ink supply unit 304 and the print head 14. In this circulation path 300, the ink stored in the main tank 302 is supplied to the print head 14 via the ink supply unit 304, and the ink that is not used for printing by the print head 14 is collected in the ink supply unit 304 and supplied to the print head 14 again.

The ink supply unit 304 is equipped with the sub tank 306 that can store the ink supplied from the main tank 302. In the circulation path 300, the ink is mainly circulated between the sub tank 306 and the print head 14. Thus, the ink stored in the sub tank 306 is supplied to the print head 14, printing is performed in the print head 14 using the supplied ink, and the ink that is not used for printing is collected in the sub tank 306.

The ink supply unit 304 is equipped with the supply flow path C2 for supplying ink from the sub tank 306, which stores a predetermined amount of ink, to the print head 14, and the collection flow path C4 for collecting ink from the print head 14 into the sub tank 306. In the circulation path 300, ink circulates mainly in the sub tank 306, the supply flow path C2, the print head 14, and the collection flow path C4.

The sub tank 306 is connected to the flow path C0 in which air flows. The decompression pump P0 is installed in the flow path C0. The decompression pump P0 is a negative pressure generation source for depressurizing the inside of the sub tank 306. Further, the liquid surface detection part 308 configured with multiple electrode pins is installed in the sub tank 306. The ink supply control part 242 can detect the height of the liquid surface of the ink stored in the sub tank 306, i.e., the remaining amount of the ink, by detecting the presence or absence of an electrical connection current between the multiple electrode pins in the liquid surface detection part 308. Moreover, the air release valve V0 is installed in the sub tank 306 to allow the inside of the sub tank 306 to communicate with the atmosphere and to be shut off from the atmosphere.

The ink supply unit 304 is equipped with the connecting flow path C1 that connects the main tank 302 to the sub tank 306. In the ink supply unit 304, the ink stored in the main tank 302 is supplied to the sub tank 306 via the connecting flow path C1. The main tank 302 is configured to be detachably attachable to the printing apparatus 10. The tank supply valve V1 is installed in the connecting flow path C1 to allow communication of the main tank 302 and the sub tank 306 and to shut off the sub tank 306 from the main tank 302.

In a case where the ink supply control part 242 detects that the ink inside the sub tank 306 has become less than a predetermined amount using the liquid surface detection part 308, the ink supply control part 242 closes the air release valve V0, the supply valve V2 (described later), the collection valve V4 (described later), and the exchange valve V5 (described later). Further, at this time, the ink supply control part 242 opens the tank supply valve V1. After that, the ink supply control part 242 drives the decompression pump P0. Accordingly, the inside of the sub tank 306 has a negative pressure and ink is supplied from the main tank 302 to the sub tank 306. Then, once the liquid surface detection part 308 detects that the ink inside the sub tank 306 has exceeded the predetermined amount, the ink supply control part 242 closes the tank supply valve V1 and stops the decompression pump P0. Accordingly, the supply of ink from the main tank 302 to the sub tank 306 is stopped.

The supply flow path C2 is equipped with the supply pump P1 and the supply valve V2. During a printing operation, by opening the supply valve V2 and driving the supply pump P1, it is possible to circulate ink in the circulation path 300 while supplying ink to the print head 14. The amount of ink to be ejected per unit of time by the print head 14 varies according to the image data. The drive of the supply pump P1 is set so that the ink flow rate in the circulation path 300 can countermeasure even a case where the print head 14 performs a printing operation with the consumption amount of the ink per unit of time being the maximum amount.

The supply flow path C2 is equipped with the relief flow path C3. The relief flow path C3 is a flow path which is located on the upstream side relative to the supply valve V2 and connects the upstream side and the downstream side of the supply pump P1. The relief valve V3, which is a differential pressure valve, is installed in the relief flow path C3. The relief valve V3 is not opened and closed by a driving mechanism but regulates the flow of the ink in the relief flow path C3 by the biasing force of a spring. In a case where the pressure applied on the relief valve V3 by the ink inside of the relief flow path C3 reaches a predetermined pressure, the relief valve V3 opens against the biasing force of the spring to tolerate the flow of ink inside of the relief flow path C3.

For example, assume that the ink supply amount per unit of time supplied to IN flow path 18*a* by the supply pump P1 is greater than the sum of the ejection amount per unit of time of the print head 14 and the ink flow rate per unit of time being flowed into the collection flow path C4 by the collection pump P2. Note that the IN flow path 18*a*, the collection pump P2, and the collection flow path C4 are described later. In this case, the relief valve V3 is opened according to the pressure acting on itself. Accordingly, a cyclical flow path configured with a portion of the supply flow path C2 and the relief flow path C3 is formed. By installing the relief flow path C3, the amount of the ink supplied to the print head 14 is adjusted according to the amount of the ink consumed by the print head 14 so as to stabilize the pressure inside of the circulation path 300 irrespective of the image data.

The collection flow path C4 is equipped with the collection pump P2 and the collection valve V4. As the ink is circulated inside the circulation path 300, the collection pump P2 serves as a negative pressure generation source, so as to suck ink from the print head 14. Driving the collection pump P2 creates an appropriate pressure difference between the IN flow path 18*a* and the OUT flow path 18*b* (described later) inside the print head 14 to generate a flow of the ink from the IN flow path 18*a* toward the OUT flow path 18*b*.

The collection valve V4 also functions as a valve to prevent backflow of ink in a case where no printing operation is being performed, i.e., in a case where ink is not being circulated in the circulation path 300. Depending on the arrangement position of the print head 14 relative to the sub tank 306, there is a possibility that the ink may flow from the sub tank 306 toward the print head 14 in a case where the supply pump P1 or the collection pump P2 is not being driven, due to a water head difference between the sub tank 306 and the print head 14. To prevent such a flow, the collection valve V4 is installed in the collection flow path C4. Note that, in a case where no printing operation is being performed, i.e., in a case where ink is not being circulated in the circulation path 300, the supply valve V2 also functions as a valve for preventing the supply of ink from the sub tank 306 to the print head 14.

The ink supply unit 304 is equipped with the head exchange flow path C5 that connects the downstream side of the supply valve V2 in the supply flow path C2 and the sub tank 306. The head exchange valve V5 is installed in the head exchange flow path C5. One end of the head exchange flow path C5 is connected to the supply flow path C2 at a predetermined position, which is on the downstream side relative to the supply valve V2 and on the upstream side relative to the print head 14. The other end of the head exchange flow path C5 is connected to the upper side of the sub tank 306 at a height position where ink is not positioned even in a case where a predetermined amount of ink is stored inside the sub tank 306. The head exchange flow path C5 is utilized at the time of pulling out ink from the print head 14 mounted in the printing apparatus 10 in a case of replacing the print head 14, transporting the printing apparatus 10, or the like. The head exchange valve V5 is controlled by the ink supply control part 242 so as to be closed except for a case of filling the print head 14 with ink and a case of collecting ink from the print head 14. Note that the supply flow path C2 is equipped with the ink temperature sensor 248 that can detect the temperature of the ink flowing into the print head 14 in the vicinity of the portion connecting to the print head 14.

In the print head 14, the ink supplied from the supply flow path C2 passes through the filter 310 and then is supplied to the first negative pressure control unit 16*a* and the second negative pressure control unit 16*b*. The first negative pressure control unit 16*a* has a control pressure that is set at a weaker negative pressure (a negative pressure with a smaller pressure difference from the atmospheric pressure) than the second negative pressure control unit 16*b*, for example, −90 mmAq. The second negative pressure control unit 16*b* has a control pressure that is set at a stronger negative pressure (a negative pressure with a larger pressure difference from the atmospheric pressure) than the first negative pressure control unit 16*a*, for example, −180 mmAq. The pressure in the first negative pressure control unit 16*a* and the second negative pressure control unit 16*b* are generated within a proper range by the driving of the collection pump P2.

On the surface that faces the print medium S conveyed by the conveyance part 12, the print head 14 is equipped with the ink ejection part 312 where a plurality of the element substrates 314 with an array of multiple nozzles are arranged to form nozzle arrays extending in the X direction for each type of ink. The ink ejection part 312 is equipped with the IN flow path 18*a* for leading the ink supplied from the first negative pressure control unit 16*a* and the OUT flow path 18*b* for leading the ink supplied from the second negative pressure control unit 16*b*. The IN flow path 18*a* and the OUT flow path 18*b* extend in the array direction of the element substrates 314.

In the ink ejection part 312, the element substrates 314 and the IN flow path 18*a* are connected, and the element substrates 314 and the OUT flow path 18*b* are connected. Therefore, in each element substrate 314, ink flows in from the IN flow path 18*a*, which has relatively weak negative pressure, and flows out to the OUT flow path 18*b*, which has relatively strong negative pressure. Therefore, in a case where ink is circulating in the circulation path 300, ink is flowing through the inside of the element substrates 314. In a case where ink is ejected by the element substrates 314, a portion of the ink flowing from the IN flow path 18*a* to the OUT flow path 18*b* is consumed by being ejected from the nozzles, but the ink that was not ejected flows out to the collection flow path C4 via the OUT flow path 18*b*. In the circulation path 300, ink is circulated at the nozzles of each element substrate 314 regardless of the ejection frequency, thereby suppressing a rise in temperature in an area with a high ejection frequency and thickening of the ink stagnating in an area with a low ejection frequency, which enables stable ink ejection from each nozzle.

<Configuration of the Element Substrates>

Figure 4:
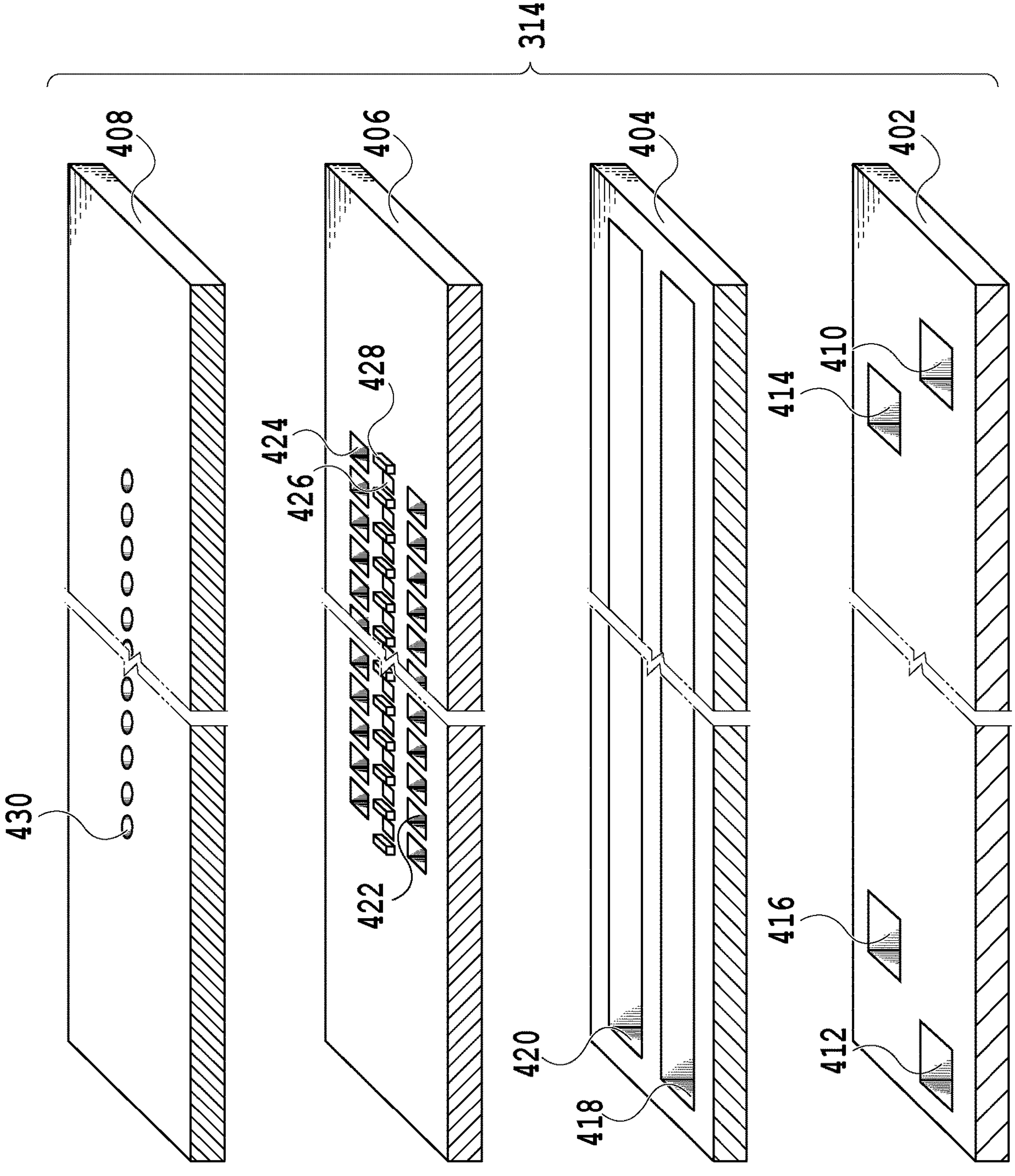
FIG. 4 is an exploded configuration diagram of an element substrate.

Next, an explanation is given about the configuration of the element substrates 314. FIG. 4 is an exploded configuration diagram of the element substrate 314. The element substrate 314 has a laminated structure where four members are laminated. Specifically, the third flow path member 402, the second flow path member 404, the first flow path member 406, and the ejection port forming member 408 are laminated in this order.

The communication ports 410 and 412 that connect to the IN flow path 18*a*, and the communication ports 414 and 416 that connect to the OUT flow path 18*b* are formed in the third flow path member 402. The communication port 410 and the communication port 412 are formed at positions with an interval in the extending direction of the third flow path member 402 (hereinafter simply referred to as the "extending direction") so as to overlap with each other in the width direction which is perpendicular to the extending direction (hereinafter simply referred to as the "width direction"). Further, the communication ports 414 and 416 are formed at positions different from the communication ports 410 and 412 in the width direction. The communication ports 414 and 416 are formed at positions with an interval in the extending direction so as to overlap with each other in the width direction.

The second flow path member 404 has the common supply flow path 418 which extends along the extending direction to communicate with the communication ports 410 and 412 in a case of being laminated with the third flow path member 402. Further, the second flow path member 404 has the common collection flow path 420 which extends along the extending direction to communicate with the communication ports 414 and 416 in a case of being laminated with the third flow path member 402. The common supply flow path 418 and the common collection flow path 420 are installed in the second flow path member 404 at different positions in the width direction so as to be parallel to each other.

The first flow path member 406 has a plurality of the individual supply flow paths 422 arranged in an array along the extending direction to communicate with the common supply flow path 418 in a case of being laminated with the second flow path member 404. Further, the first flow path member 406 has a plurality of the individual collection flow paths 424 formed at an interval from the individual supply flow paths 422 in the width direction and arranged in an array along the extending direction to communicate with the common collection flow path 420 in a case of being laminated with the second flow path member 404. Moreover, the first flow path member 406 has a plurality of the printing elements 426 arranged at regular intervals along the extending direction between the individual supply flow paths 422 and the individual collection flow paths 424 in the width direction, and the partitions 428 are formed between each printing element 426. Note that, although illustration in the drawings is omitted, a drive circuit for supplying power to each of the printing elements 426 and the like are also formed in the first flow path member 406.

The ejection port forming member 408 has the ejection ports 430, which are for ejecting ink, at positions corresponding to the respective printing elements 426 in a case of being laminated with the first flow path member 406.

In the element substrate 314, the ink flowing in from IN flow path 18*a* flows through the communication ports 410 and 412, the common supply flow path 418, and the individual supply flow paths 422 into the pressure chamber 502 (see FIG. 5A and FIG. 5B), which is formed with the partitions 428, the first flow path member 406, and the ejection port forming member 408. Further, of the ink that flows into the pressure chamber 502, the ink that is not ejected from the ejection ports 430 flows out through the individual collection flow paths 424, the common collection flow path 420, and the communication ports 414 and 416 to the OUT flow path 18*b*.

In the present embodiment, the printing elements 426 are electrothermal conversion elements that generate thermal energy by applying voltage. In a case where voltage is applied to the printing elements 426 according to a control signal, film boiling occurs in the ink in contact with the printing elements 426, and the growth energy of the generated bubbles causes ink droplets to be ejected from the ejection ports 430 at positions corresponding to the printing elements 426. Note that, in the present specification, as described above, the ejection ports and the flow paths in communication therewith, including the ejection ports 430 and the pressure chamber 502, are referred to as nozzles. Further, the printing elements 426 are not limited to electrothermal conversion elements, and various known energy generating elements such as piezoelectric elements can be used.

Note that, in the explanation using FIG. 4, an explanation is given of the configuration corresponding to one nozzle array on the element substrate 314 for ease of understanding. In the present embodiment, the print head 14 is configured to eject four types of ink, and thus the above-described configuration is formed according to the types of ink on the nozzle surface. Further, the shapes and formed positions of the flow paths described above are merely examples and can be changed as appropriate.

<Ink Flow at the Nozzles>

Figure 5A:
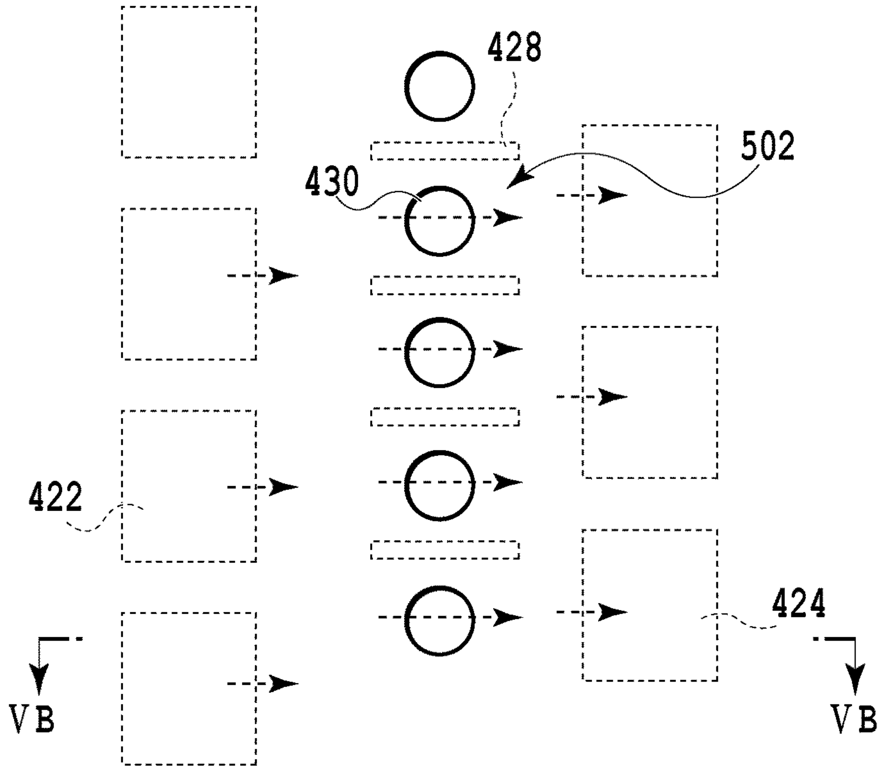
FIG. 5A and FIG. 5B are diagrams for explaining a flow path of ink on an element substrate.
Figure 5B:
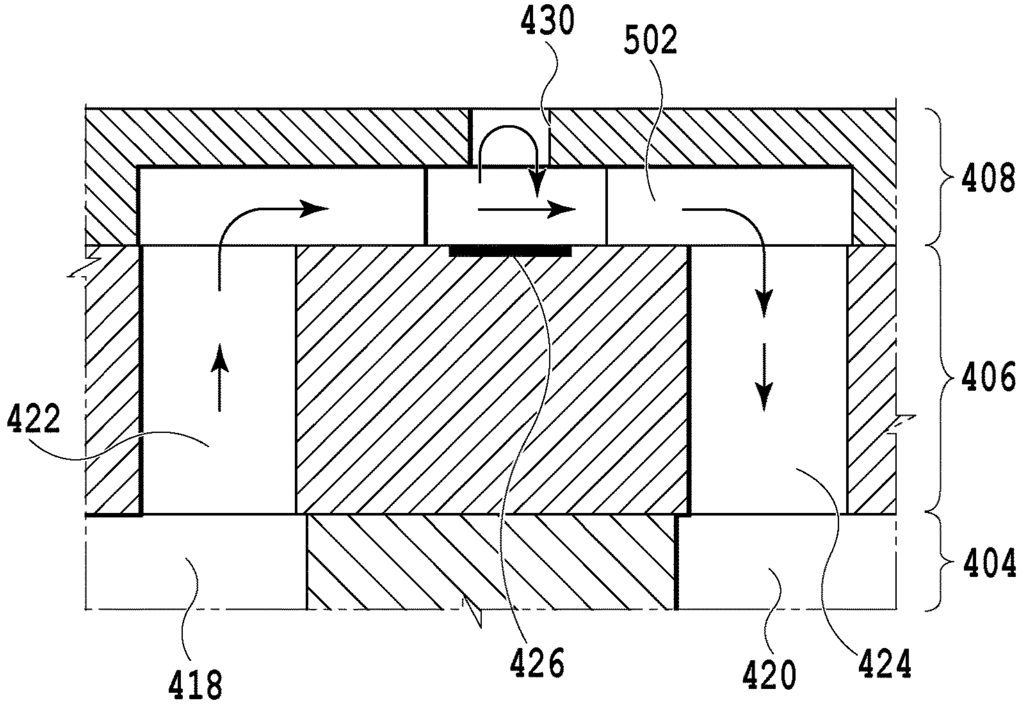

Next, an explanation is given about the ink flow in the vicinity of the nozzles. FIG. 5A and FIG. 5B are diagrams for explaining the flow of ink at the nozzles. FIG. 5A is a plan view of a portion of the printing element 426 centered on the ejection port 430, and FIG. 5B is a cross-sectional view taken along the VB-VB line of FIG. 5A.

The ink that flows into the individual supply flow path 422 passes through the pressure chamber 502 formed by the partition 428, etc., and flows out into the individual collection flow path 424. In a case where a voltage pulse is applied to the printing element 426, film boiling is generated in the ink flowing through the pressure chamber 502, and the growth energy of the bubbles causes some of the ink inside the pressure chamber 502 to be ejected as droplets from the ejection port 430.

In a case where the pressure chamber 502 is in a state filled with ink, the ejection port 430 has a meniscus formed by the ink inside. The meniscus in the ejection port 430 is exposed to the atmosphere, and the liquid components in the ink evaporate. Therefore, if ink is ejected infrequently during printing operations at the ejection port 430, the meniscus is exposed to the atmosphere for a longer period of time, which increases evaporation of the liquid components, which may result in an increase in the ink viscosity. Note that, the present embodiment has a configuration in which ink is circulated in the circulation path 300 which includes the flow paths in the element substrates 314. Therefore, during circulation, the ink in the vicinity of the meniscus is also circulated by the flow generated in the pressure chamber 502, and at each of the ejection ports 430, an increase in the viscosity of the ink can be suppressed regardless of the frequency of ink ejection.

<Arrangement of the Head Temperature Sensor>

Figure 6A:
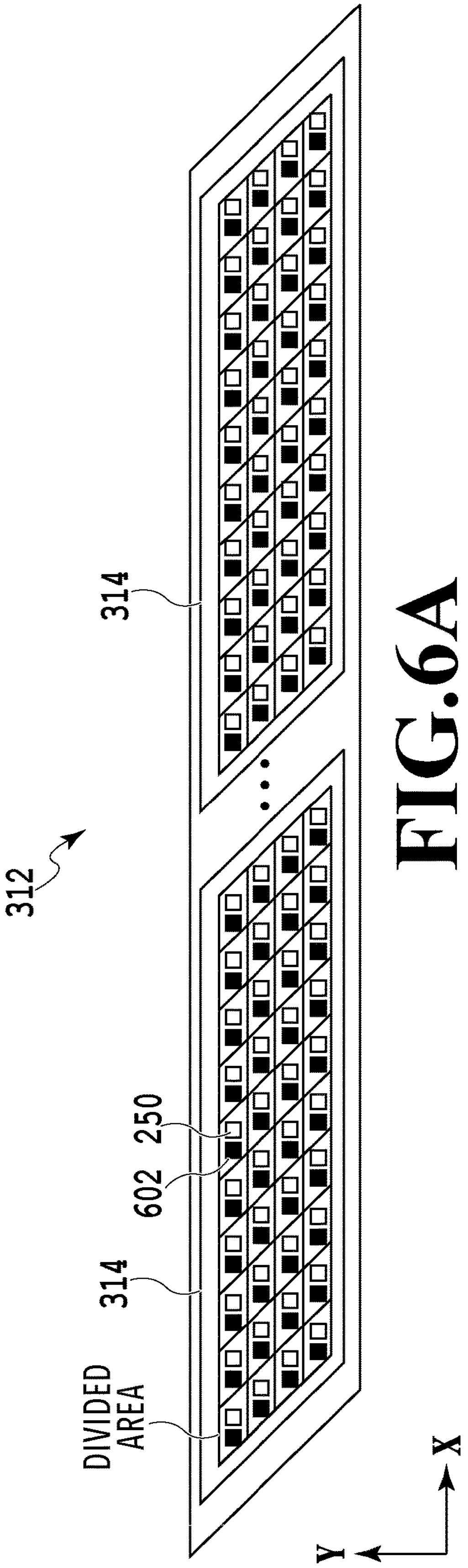
FIG. 6A and FIG. 6B are diagrams illustrating the arrangement positions of head temperature sensors and the like on an element substrate.
Figure 6B:
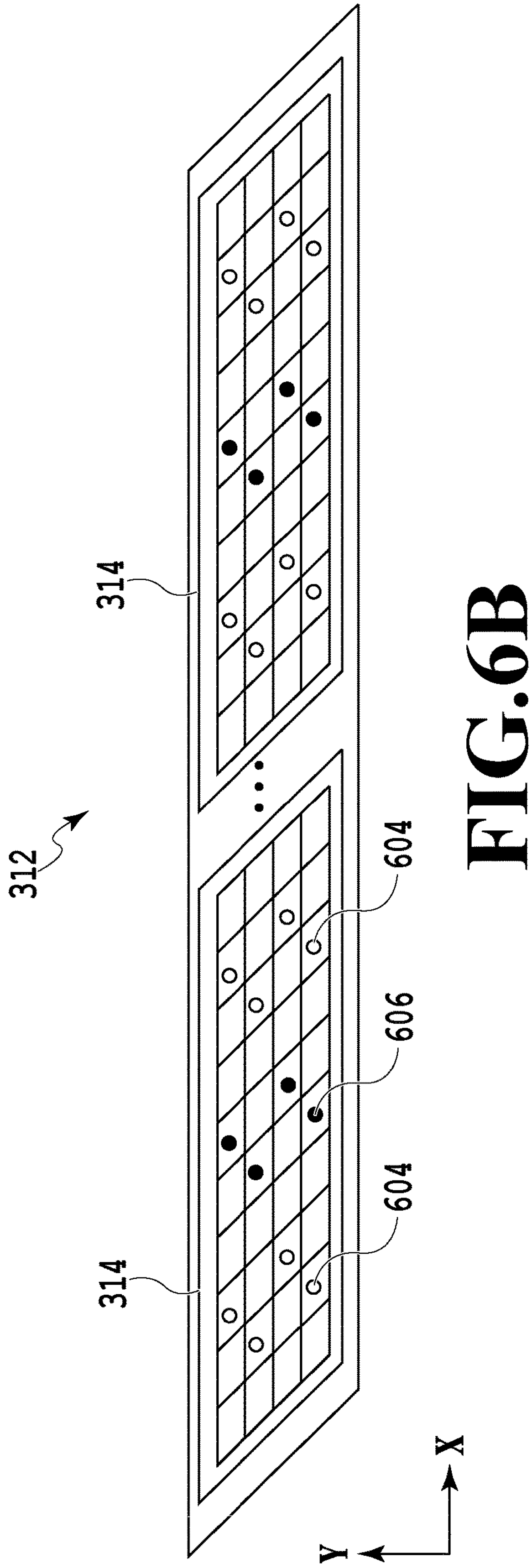

Next, an explanation is given about the arrangement of the head temperature sensors 250, which can detect the temperature of the print head 14. FIG. 6A and FIG. 6B are diagrams for explaining the arrangement of the head temperature sensors 250. FIG. 6A is a diagram illustrating the arrangement positions of the head temperature sensors 250 and the sub-heaters on the element substrates 314, and FIG. 6B is a diagram illustrating the arrangement positions of the substrate inlet ports and the substrate outlet ports on the element substrates 314. In FIG. 6A and FIG. 6B, for ease of understanding, the configurations on the element substrate 314 other than the head temperature sensors 250, the sub-heaters, the substrate inlet ports, and the substrate outlet ports are omitted from the illustration.

In the ink ejection part 312, a plurality of the element substrates 314 is arranged in an array in the extending direction (the X direction) of the print head 14. In the present embodiment, each of the element substrates 314 is formed in a congruent parallelogram shape. Each of the element substrates 314 is divided into 40 areas (4 in the transverse direction and 10 in the longitudinal direction), and the sub-heaters 602 and the head temperature sensors 250 are arranged in each divided area. The sub-heaters 602 are configured to apply heat to each divided area for the temperature of the element substrate 314, and, in the present embodiment, electrothermal conversion elements are used. Note that the sub-heaters 602 are configured to be installed separately from the printing elements 426 that are for generating ejection energy. Further, the head temperature sensors 250 are temperature detecting elements, and, as an example, diode sensors may be used. In the present embodiment, the head temperature sensors 250 function as a detection part to detect the temperature of the print head 14.

Further, each of the element substrates 314 is equipped with the substrate inlet ports 604 and the substrate outlet ports 606. At the element substrates 314, ink flows into the element substrates 314 via the substrate inlet ports 604 and out of the element substrates 314 via the substrate outlet ports 606. Note that the substrate inlet ports 604 correspond to the communication ports 410 and 412 in FIG. 4, and the substrate outlet ports 606 correspond to the communication ports 414 and 416 in FIG. 4. Further, the numbers and arrangement positions of the substrate inlet ports 604 and substrate outlet ports 606 can be changed as appropriate. Therefore, the arrangement position and number of each of the connection ports in FIG. 4 do not correspond to the arrangement positions and numbers of the substrate inlet ports and the substrate outlet ports in FIG. 6B.

The ink supply control part 242 controls the drive of the sub-heaters 602 arranged in each block and the drive of the supply pump P1 and the collection pump P2, etc., based on the temperature detected by the head temperature sensors 250 arranged in each divided area of the element substrates 314.

<Obtainment Process>

In the above-described configuration, the print head 14 in the printing apparatus 10 is replaced according to the usage state of the print head 14. Here, in the print head 14, diode sensors are used as the head temperature sensors 250 on the element substrates 314. Note that diode sensors have a large offset error, and thus it is necessary to calibrate the detected temperature of the head temperature sensors 250. For this reason, the printing apparatus 10 executes an obtainment process to obtain a calibration value to calibrate the detected temperature of the head temperature sensors 250 after the print head 14 is replaced.

Here, the printing apparatus 10 is equipped with the environmental temperature sensor 246 that detects the environmental temperature in the vicinity of the print head 14, the ink temperature sensor 248 that detects the temperature of the ink flowing into the print head 14, and the head temperature sensors 250, as temperature sensors. Note that the environmental temperature sensor 246 and ink temperature sensor 248 have higher detection accuracy than the head temperature sensors 250.

Hereinafter, an explanation is given about the obtainment process for obtaining a calibration value to calibrate the detected temperature of the head temperature sensors 250. Note that the obtainment process is executed in parallel with the processing for filling the print head 14 after replacement with ink.

=Overview=

Figure 7:
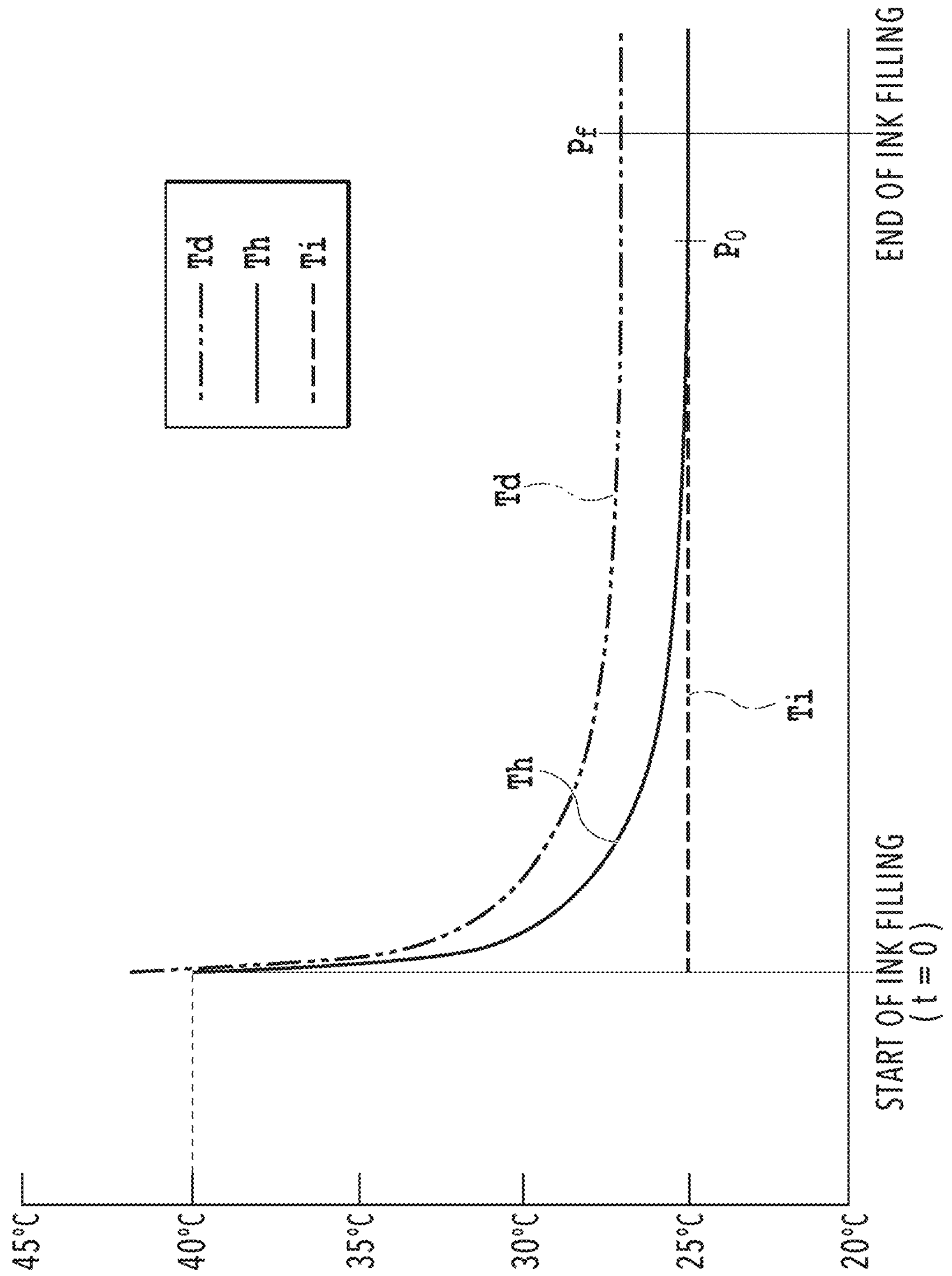
FIG. 7 is a graph illustrating the change in the detected temperature of each sensor and the actual temperature of a print head.

First, an explanation is given of an overview of the obtainment process that is executed in the present embodiment. FIG. 7 is a diagram illustrating the changes in the detected temperature from the head temperature sensors 250, the detected temperature from the ink temperature sensor 248, and the actual temperature of the print head 14 in a case where the print head 14 after replacement is filled with ink. In FIG. 7, the horizontal axis is time and the vertical axis is temperature. Further, in FIG. 7, at the start of the filling of the print head 14 (t=0), the actual temperature of the print head is 40° C., and the temperature of the ink inside the circulation path 300 is 25° C. Furthermore, in FIG. 7, the change in the detected temperature Td of the head temperature sensors 250 after starting the filling of the print head 14 is illustrated with a double-dotted line, the change in the detected temperature Ti of the ink temperature sensor 248 is illustrated with a dashed line, and the change in the actual temperature Th of the print head 14 is illustrated with a solid line. Note that, in the present embodiment, it is assumed that the temperature of the ink in the circulation path 300 matches or approximates the environmental temperature in the vicinity of the print head 14.

Upon starting to fill the print head 14 with ink, that is, starting the supply of ink to the print head 14 after replacement, the ink inside the circulation path 300 flows into the print head 14 after its temperature is detected by the ink temperature sensor 248. Therefore, the detected temperature from the ink temperature sensor 248 is the ink temperature inside the circulation path 300. Further, since the ink inside the circulation path 300 continues to flow into the print head 14 until the filling of ink ends, the detected temperature Ti of the ink temperature sensor 248 is always constant. Note that filling (supplying) of ink is executed by the print controller 208 controlling the ink supply control part 242. Thus, in the present embodiment, the print controller 208 and the ink supply control part 242 function as the supply part that supplies ink to the print head 14.

The actual temperature Th of the print head 14 is an accurate temperature of the print head 14, which is to be detected by the head temperature sensors 250. In the present embodiment, since the substrate inlet ports 604 and the substrate outlet ports 606 are provided at multiple locations, at the predetermined timing $P_0$ before the filling of ink ends, the actual temperature Th of the print head 14 is the same as the detected temperature Ti of the ink temperature sensor 248. However, in a case where the detected temperature Td of the head temperature sensors 250 is different from the detected temperature Ti at the predetermined timing $P_0$, it is necessary to calibrate the detected temperature Td.

The actual temperature Th matches the detected temperature Ti between the predetermined timing $P_0$ and the timing $P_f$ at which the filling ends. Therefore, the calibration value Tadj for calibrating the detected temperature Td can be calculated by the following formula using the detected temperature Td from the head temperature sensors 250 and the detected temperature Ti from the ink temperature sensor 248 at the timing $P_f$ at which the filling of the ink ends.

$$Tadj = Ti - Td \tag{1}$$

That is, the calibration value Tadj is the value obtained by subtracting the detected temperature Td from the detected temperature Ti. Note that, in the above-described formula (1), the detected temperature Td and the detected temperature Ti are not limited to the temperatures detected at the timing $P_f$. The detected temperatures Td and Ti may be at any timing between the predetermined timing $P_0$ and the timing $P_f$, where the actual temperature Th and the detected temperature Ti match. The timing is decided based on experiments, for example, according to the type of ink, the materials for configuring the print head, or the like.

=Specific Processing=

Figure 8:
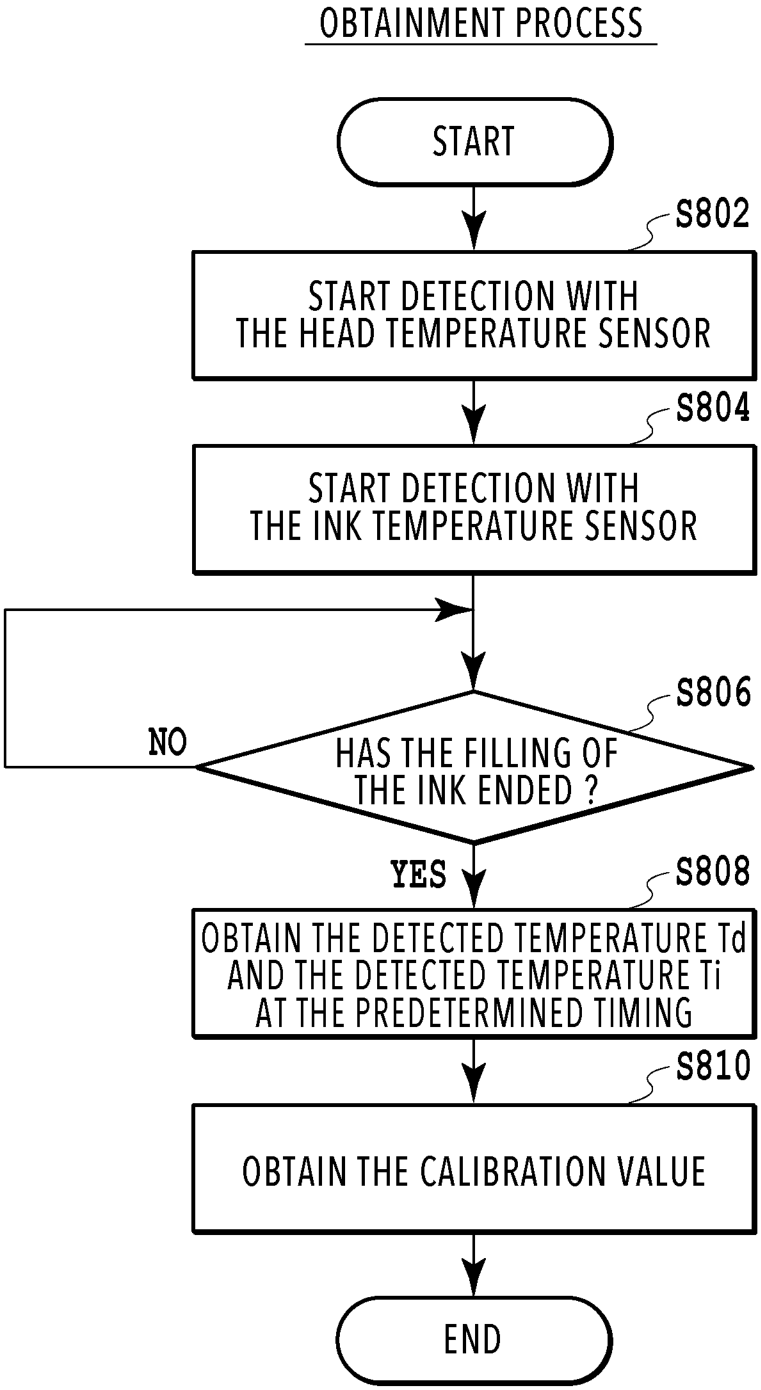
FIG. 8 is a flowchart illustrating the details of processing of an obtainment process in the first embodiment.

Next, an explanation is given about the specific details of processing of the obtainment process. FIG. 8 is a flowchart illustrating the details of processing of the obtainment process. The series of processes illustrated in the flowchart of FIG. 8 is performed by the print controller 208 loading a program code stored in the ROM 228 into the RAM 230 and executing it. Alternatively, a part or all of the functions in the steps of FIG. 8 may be executed by hardware such as an ASIC or an electronic circuit. Note that, in the present specification, the sign "S" in the explanation of each process in a flowchart indicates that it is a step in that flowchart.

In a case where the obtainment process is started, first, in S802, the print controller 208 starts detecting the temperature of the print head 14 with the head temperature sensors 250. Note that the head temperature sensor 250 that starts the detection is, for example, the predetermined head temperature sensor 250 set in advance. Further, in S804, the print controller 208 starts detecting the temperature of the ink flowing into the print head 14 with the ink temperature sensor 248. Note that S804 may be executed before S802, or S802 and S804 may be executed simultaneously. The print controller 208, for example, continues to detect the temperatures with the head temperature sensor 250 and the ink temperature sensor 248 at regular intervals until it is determined that the filling of the print head 14 with ink ends in the later-described S806. Then, in S806, the print controller 208 determines whether or not the filling of the print head 14 after replacement with ink has ended.

In S806, if it is determined that the filling of ink has not ended, the processing returns to S806. Further, if it is determined in S806 that the filling of the ink has ended, the processing proceeds to S808. In S808, the print controller 208 obtains the detected temperature Td from the head temperature sensor 250 and the detected temperature Ti from the ink temperature sensor 248 at a predetermined timing. The predetermined timing is, for example, the timing where filling of ink ends (or the timing of detection closest to the timing where the filling of the ink ends). Next, in S810, the print controller 208 obtains the calibration value Tadj using the detected temperature Td and the detected temperature Ti obtained in S808, and this obtainment process ends. In S810, the calibration value Tadj is to be obtained using the above-described formula (1).

The calibration value obtained with the obtainment process is stored in, for example, the storage area of the print engine unit 202 or the controller unit 206. Further, regarding the control using the detected temperature Td from the head temperature sensors 250, the control is executed based on the value obtained by adding the calibration value Tadj to the detected temperature Td. Thus, in the present embodiment, the print controller 208 functions as an obtainment part that obtains the calibration value for calibrating the detected temperature from the head temperature sensors 250.

In the explanation of the obtainment process described above, the detected temperatures from the head temperature sensor 250 and the ink temperature sensor 248 are continuously obtained during filling of ink, but there is no limitation as such. After the obtainment process starts, whether or not the predetermined timing has been reached may be determined, so that the detected temperature Td from the head temperature sensor 250 and the detected temperature Ti from the ink temperature sensor 248 is obtained once it is determined that the predetermined timing has been reached. In this case, in S810, the calibration value Tadj is obtained based on the detected temperature Td and the detected temperature Ti obtained at the predetermined timing. The predetermined timing may be, for example, the timing $P_f$ where filling of the print head 14 after replacement with ink ends, or any timing between the predetermined timing $P_0$ where the actual temperature Th and the detected temperature Ti match (see FIG. 7) and the timing $P_f$.

<Functional Effect>

As explained above, in the present embodiment, the temperature of the ink flowing into the print head 14 and the detected temperature from the temperature sensors in the print head 14 are used as temperature information to obtain the calibration value based on the above-described formula (1). The temperature information obtained during filling of the print head 14 after replacement with ink allows the calibration value to be obtained, and reduces the time period required to obtain the calibration value. Further, by utilizing the temperature information including the temperature of the ink, it is possible to obtain the calibration value for calibrating the detected temperature from the head temperature sensors with high accuracy.

Second Embodiment

Figure 9:
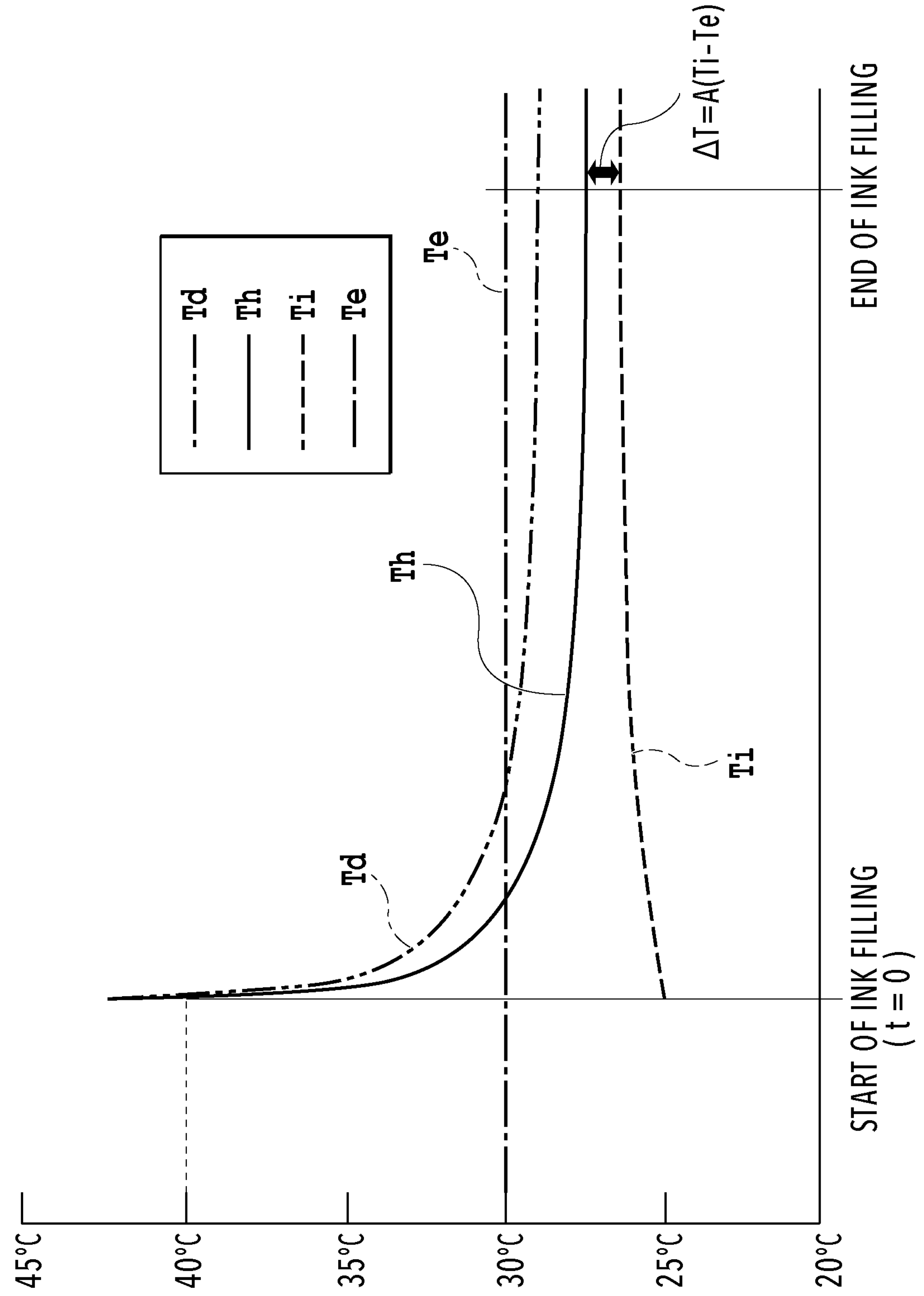
FIG. 9 is a graph illustrating the change in the detected temperature of each sensor and the actual temperature of the print head.
Figure 10:
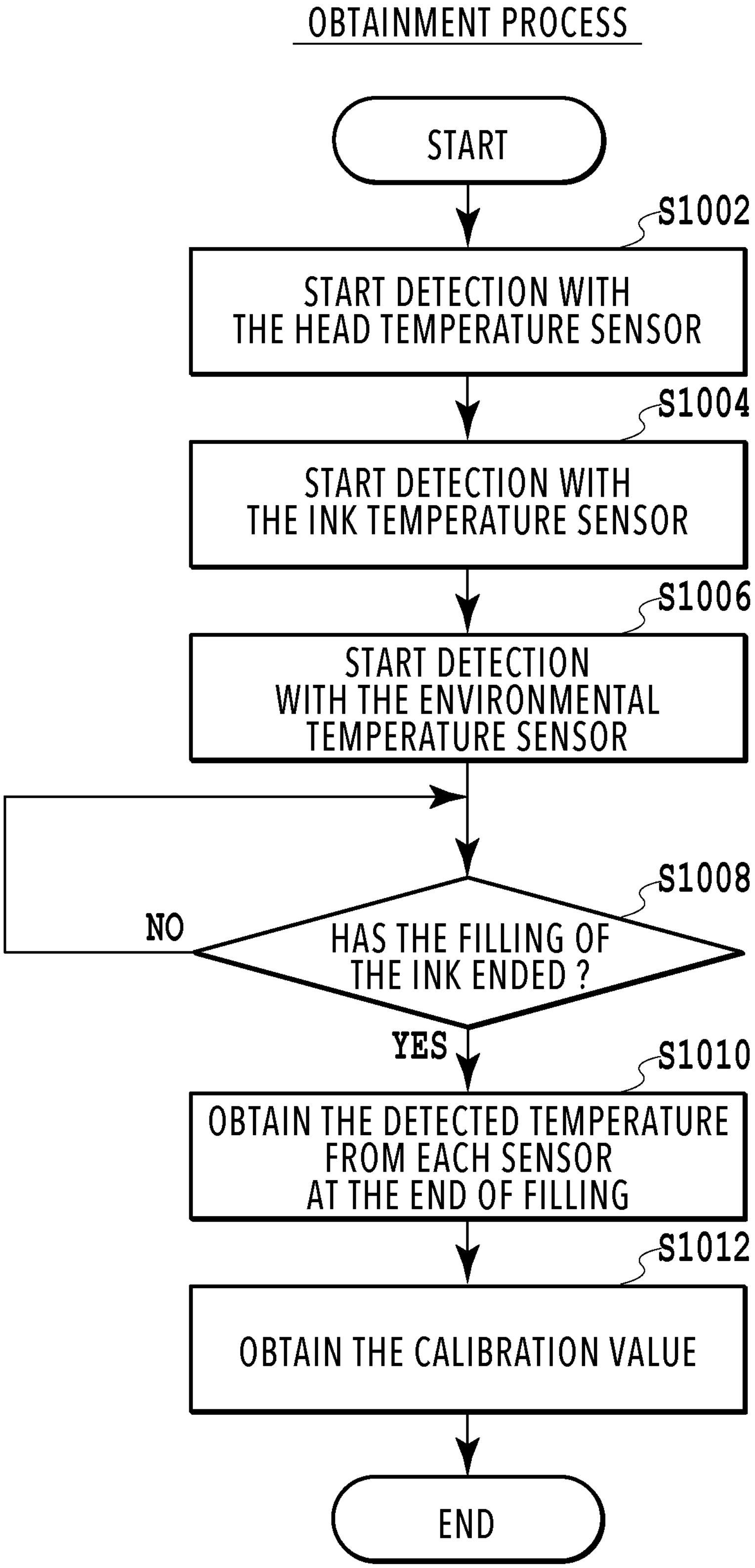
FIG. 10 is a flowchart illustrating the details of processing of an obtainment process in the second embodiment.

Next, with reference to FIG. 9 and FIG. 10, an explanation is given about the printing apparatus according to the second embodiment. In the following explanation, configurations that are the same or correspond to those of the printing apparatus according to the first embodiment described above are assigned with the same signs as those used in the first embodiment, so as to omit detailed explanations thereof.

In a printing apparatus where the ink temperature is controlled by a cooling mechanism or the like, or in a printing apparatus to which a main tank is mounted immediately after being carried out of the inside of a car under blazing sunlight, a warehouse in a cold condition, or the like, the temperature of the circulating ink will differ from the environmental temperature. Therefore, in such a printing apparatus, with a known technology for obtaining a calibration value for temperature sensors installed in the print head using the temperature of the print head and the environmental temperature as the temperature information, it is difficult to accurately obtain the calibration value.

Therefore, the second embodiment ensures that the calibration value can be obtained accurately even if the temperature of the ink flowing into the print head differs from the environmental temperature. This second embodiment differs from the above-described first embodiment in an aspect that the detected temperature from the environmental temperature sensor is included as the temperature information, in addition to the detected temperature from the head temperature sensor and the detected temperature from the ink temperature sensor. Hereinafter, a detailed explanation is given about the obtainment process executed by the printing apparatus according to the second embodiment.

<Obtainment Process>

An explanation is given about an overview of the obtainment process executed by the printing apparatus according to the second embodiment.

=Overview=

First, an explanation is given about an overview of the obtainment process executed by the printing apparatus according to the second embodiment. FIG. 9 is a diagram illustrating the changes in the detected temperature Td from the head temperature sensors 250, the detected temperature Ti from the ink temperature sensor 248, and the actual temperature Th of the print head 14 in a case where the print head 14 after replacement is filled with ink. In FIG. 9, the horizontal axis is time and the vertical axis is temperature. Further, in FIG. 9, at the start of the filling of the print head 14 (t=0), the actual temperature Th of the print head is 40° C., the temperature of the ink inside the circulation path 300 is 25° C., and the environmental temperature Te is 30° C. Further, in FIG. 9, the change in the detected temperature Td after starting the filling of the print head 14 is illustrated with a double-dotted line, the change in the detected temperature Ti is illustrated with a dashed line, the change in the actual temperature Th is illustrated with a solid line, and the environmental temperature Te is illustrated with a single-dotted line. The environmental temperature Te is the temperature detected by the environmental temperature sensor 246.

In a case where the filling of the print head 14 with ink starts, the ink inside the circulation path 300 flows into the print head 14 after its temperature is detected by the ink temperature sensor 248. At this time, since the environmental temperature Te and the temperature of the ink in the circulation path 300 differ from each other, heat transfer occurs between the ink inside the circulation path 300 and the environment until the filling of ink is completed. Specifically, heat transfer occurs between the ink circulating in the circulation path 300 (i.e., the ink heading from the sub tank 306 to the print head 14) and the ink that has flowed into the print head 14 and the space in the vicinity of the print head 14. Therefore, after the start of the filling of ink, the detected temperature Ti from the ink temperature sensor 248 approaches the environmental temperature Te with the passing of a time period.

If there is no difference between the environmental temperature and the ink temperature inside the circulation path 300, the actual temperature Th of the print head 14 will match the ink temperature, i.e., the detected temperature Ti from the ink temperature sensor 248, at the end of filling, as explained in the first embodiment. However, if there is a difference between the environmental temperature and the ink temperature inside the circulation path 300, the actual temperature Th at the end of filling will be a value differing by $\Delta T$ from the detected temperature Ti from the ink temperature sensor 248.

$\Delta T$ is caused by heat transfer between the ink and the environment during the time the ink at the ink temperature sensor 248 installed outside the print head 14 reaches the head temperature sensor 250 installed inside the print head 14. Therefore, if A is the proportionality coefficient that is proportional to the heat transfer rate between the environment and the ink during the time the ink at the ink temperature sensor 248 reaches the head temperature sensor 250, ΔT is represented by the following formula.

$$\Delta T = A(Ti - Te) \quad (2)$$

The temperature Ti' of the ink at the time the ink reaches the head temperature sensor 250 is the value of the detected temperature Ti minus ΔT, and the actual temperature That the end of filling matches Ti', i.e., Th=Ti'. That is, Th=Ti−A(Ti−Te). Thus, the calibration value Tadj of the head temperature sensor 250 is then Tadj=Ti'−Td, which can be calculated by the following formula.

$$Tadj = \{Ti - A(Ti - Te)\} - Td \quad (3)$$

=Specific Processing=

Next, an explanation is given about the specific details of processing of the obtainment process executed by the printing apparatus 10 according to the second embodiment. FIG. 10 is a flowchart illustrating the details of processing of the obtainment process executed by the printing apparatus 10 according to the second embodiment. The series of processes illustrated in the flowchart of FIG. 10 is performed by the print controller 208 loading a program code stored in the ROM 228 into the RAM 230 and executing it. Alternatively, a part or all of the functions in the steps of FIG. 10 may be executed by hardware such as an ASIC or an electronic circuit.

In the printing apparatus 10, once filling of the print head 14 after replacement with ink is started, the print controller 208 starts the obtainment process to obtain the calibration value to calibrate the detected temperature from the head temperature sensor 250.

Once the obtainment process is started, first, in S1002, the print controller 208 starts detecting the temperature of the print head 14 with the head temperature sensor 250. Note that the head temperature sensor 250 that starts the detection is, for example, the predetermined head temperature sensor 250 set in advance. Further, in S1004, the print controller 208 starts detecting the temperature of the ink flowing into the print head 14 with the ink temperature sensor 248. Moreover, in S1006, the print controller 208 starts detecting the temperature of the surrounding area of the print head 14 with the environmental temperature sensor 246. Note that the order of execution of S1002, S1004, and S1006 is not limited to the sequence described above and can be in any order. Further, S1002, S1004, and S1006 may be executed simultaneously. In these processes, the print controller 208 continues detecting the temperatures at the respective temperature sensors at regular intervals until, for example, it is determined that the filling of the print head 14 with ink has ended in the later-described S1008.

Next, in S1008, the print controller 208 determines whether or not the filling of the print head 14 after replacement with ink has ended. If it is determined in S1008 that the filling of the ink has not ended, the processing returns to S1008. Further, if it is determined in S1008 that the filling of the ink has ended, the processing proceeds to S1010. In S1010, the print controller 208 obtains the detected temperatures from the respective sensors at the point in time where the filling of the ink ends (or at the detection timing closest to the timing where the filling of the ink ends). In other words, in S1010, the detected temperature Td from the head temperature sensor 250, the detected temperature Ti from the ink temperature sensor 248, and the detected temperature from the environmental temperature sensor 246 (the environmental temperature Te) are obtained.

After that, in S1012, the print controller 208 obtains the calibration value Tadj using the detected temperature Td, the detected temperature Ti, and the environmental temperature Te obtained in S1010, and this obtainment process ends. In S1012, the calibration value Tadj is obtained using the above-described formula (3). The calibration value obtained with the obtainment process is stored in, for example, the storage area of the print engine unit 202 or the controller unit 206. Further, regarding the control using the detected temperature Td from the head temperature sensors 250, the control is executed based on the value obtained by adding the calibration value Tadj to the detected temperature Td.

Note that, in the explanation of the obtainment process described above, the detected temperatures from the head temperature sensor 250, the ink temperature sensor 248, and the environmental temperature sensor 246 are continuously obtained during the filling of the ink, but there is no limitation as such. For example, the detected temperatures from the head temperature sensor 250, the ink temperature sensor 248, and the environmental temperature sensor 246 may be obtained at the timing where it is determined that the filling of the ink has ended, and the obtained detected temperatures may be used to obtain the calibration value Tadj from the above-described formula (3).

<Functional Effect>

As explained above, in the present embodiment, the calibration value for calibrating the detected temperature from the head temperature sensor 250 is obtained using the detected temperatures from the head temperature sensor 250, the ink temperature sensor 248, and the environmental temperature sensor 246 with the above-described formula (3). Accordingly, in addition to the functional effect of the above-described first embodiment, it is possible to obtain a calibration value accurately even if the temperature of the ink flowing into the print head 14 differs from the environmental temperature.

Third Embodiment

Next, with reference to FIG. 11 to FIG. 14, an explanation is given about a printing apparatus according to the third embodiment. In the following explanation, configurations that are the same or correspond to those of the printing apparatus according to the first embodiment described above are assigned with the same signs as those used in the first embodiment, so as to omit detailed explanations thereof.

The third embodiment differs from the above-described first embodiment and the above-described second embodiment in an aspect that the calibration value is obtained for each of the head temperature sensors 250 to countermeasure variation in the detected temperatures among the multiple head temperature sensors 250 installed on the element substrates 314. Hereinafter, a detailed explanation is given about the obtainment process executed in the printing apparatus according to the third embodiment.

<Obtainment Process>

Figure 11:
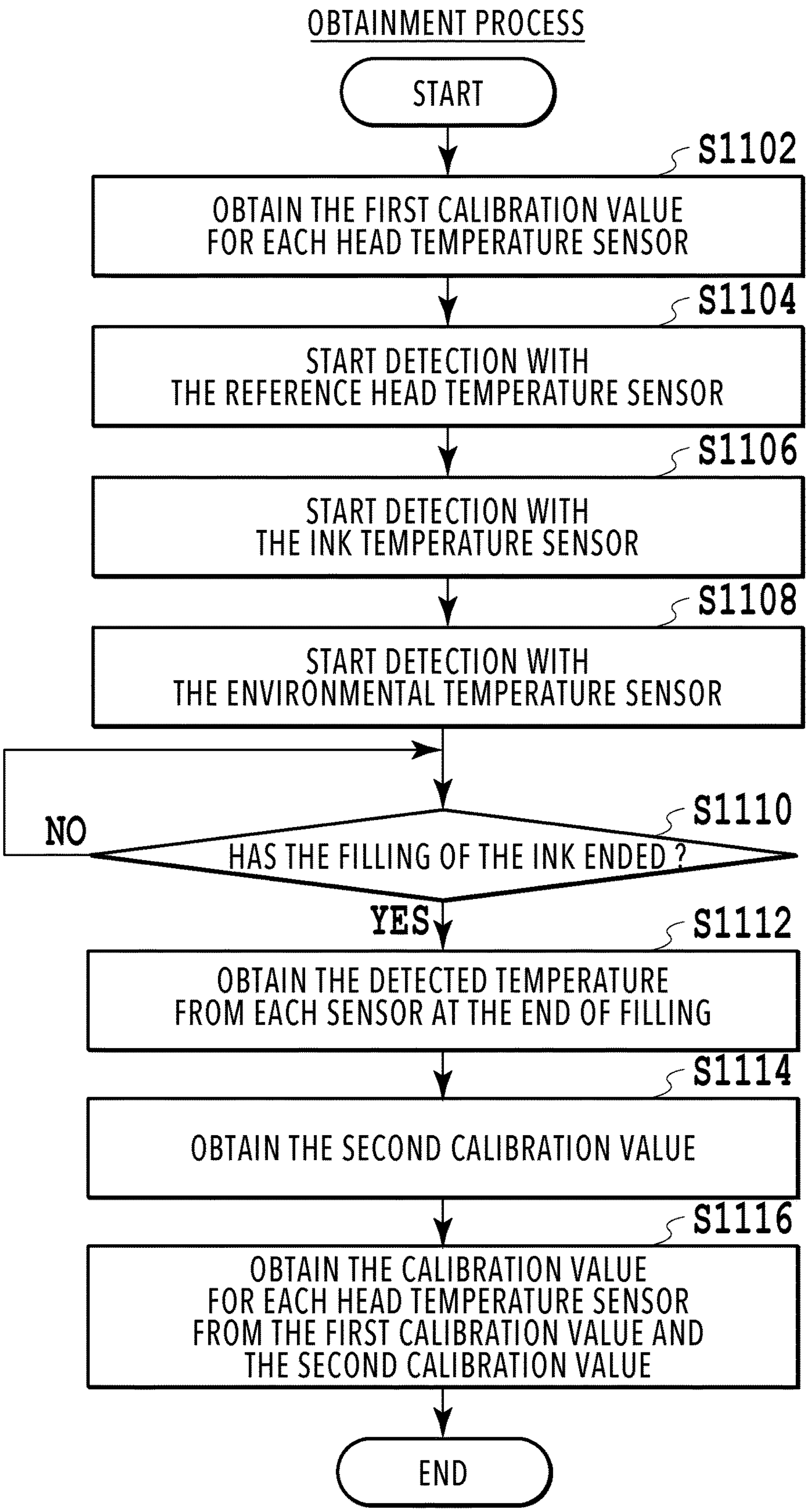
FIG. 11 is a flowchart illustrating the details of processing of an obtainment process in the third embodiment.
Figure 12:
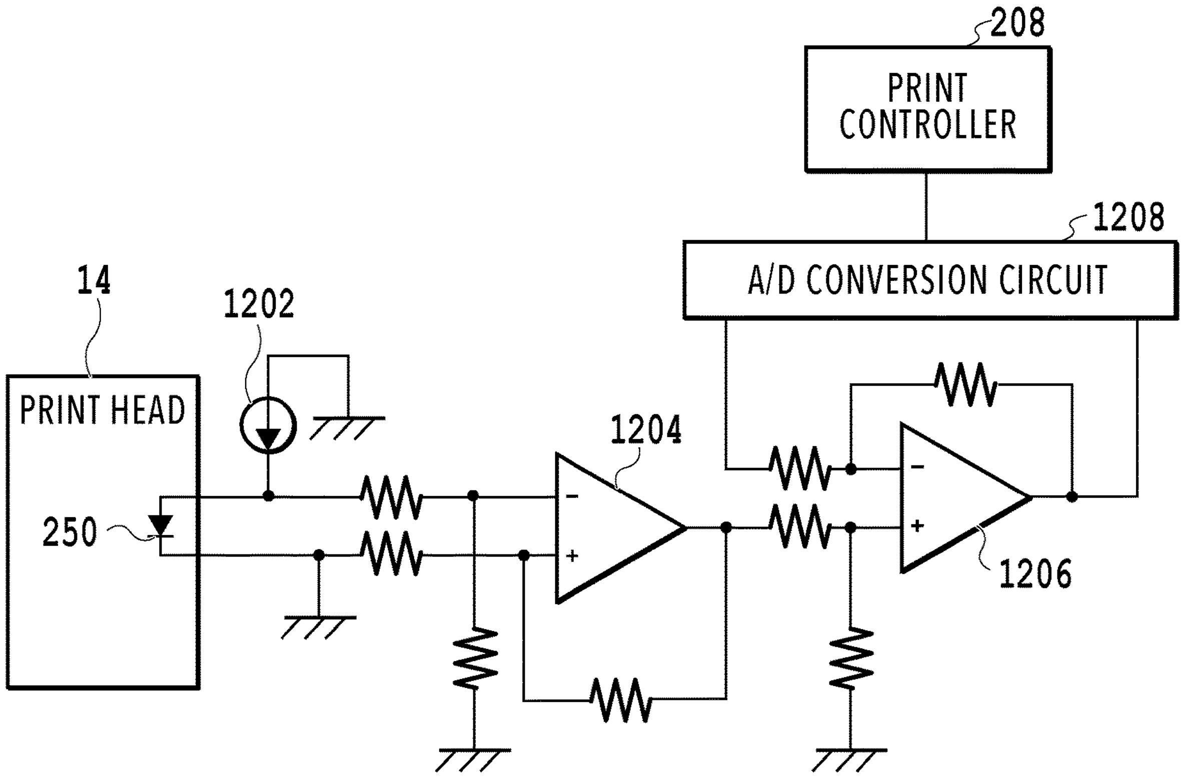
FIG. 12 is a diagram illustrating a circuit that detects the temperature of the print head.
Figure 13:
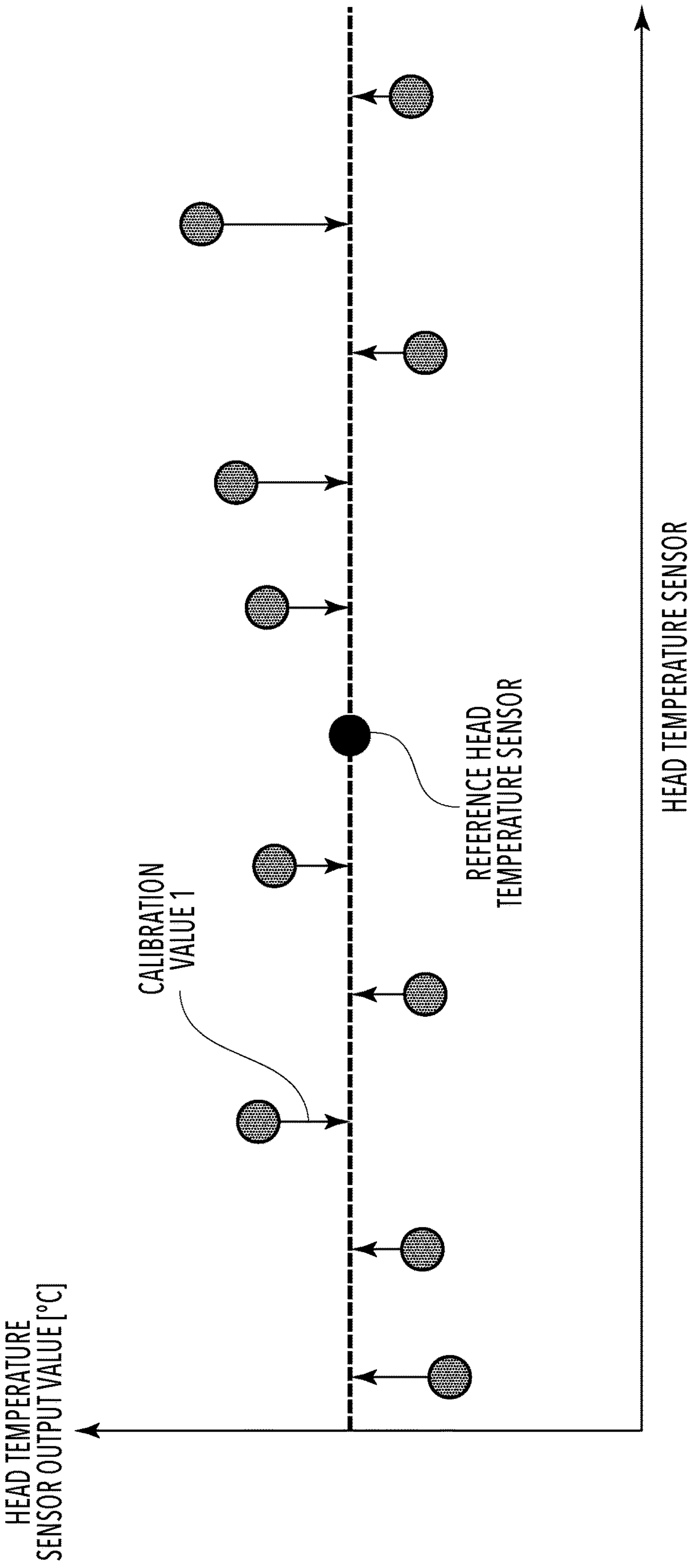
FIG. 13 is an image diagram illustrating the calibration of the variation in the detected temperatures from the head temperature sensors.

FIG. 11 is a flowchart illustrating the details of processing of the obtainment process executed by the printing apparatus 10 according to the third embodiment. FIG. 12 is a diagram illustrating the circuit that detects the temperature of the print head 14, and FIG. 13 is a diagram illustrating an image of the calibration of the individual unit's variation in the detected temperature from the head temperature sensors 250. The series of processes illustrated in the flowchart of FIG. 1 is performed by the print controller 208 loading a program code stored in the ROM 228 into the RAM 230 and executing it. Alternatively, a part or all of the functions in the steps of FIG. 11 may be executed by hardware such as an ASIC or an electronic circuit.

In the printing apparatus 10, once filling of the print head 14 after replacement with ink is started, the print controller 208 starts the obtainment process to obtain the calibration value to calibrate the detected temperature from the head temperature sensor 250.

Once the obtainment process starts, first, in S1102, the print controller 208 obtains the first calibration value for each of the head temperature sensors 250. The first calibration value is a calibration value for calibrating the individual unit's variation in the detected temperature from each of the head temperature sensors 250 and is a unique value provided for each of the head temperature sensors 250.

In the circuit that detects the temperature of the print head 14, a bias current is supplied to the head temperature sensor 250 by the constant current circuit 1202 installed outside the print head 14, and the forward voltage of the head temperature sensor 250 is amplified by the amplifier circuits 1204 and 1206 (see FIG. 12). Furthermore, the output voltage of the amplifier circuit 1206 is converted to digital data by the A/D conversion circuit 1208, and the print controller 208 obtains the temperature information (the detected temperature) of the print head 14 based on that digital data.

Here, the relationship between the forward voltage Vf of the head temperature sensor 250 and the detected temperature is 2.1 mV/° C., and the forward voltage Vf is amplified twofold by the amplifier circuit 1204 and fivefold by the amplifier circuit 1206. In other words, the forward voltage Vf is amplified tenfold via the two amplifier circuits 1204 and 1206. Therefore, the relationship between the amplified forward voltage Vf and the detected temperature becomes 21 mV/° C. in a case of being input to the A/D conversion circuit 1208.

The offset error Eofs of the head temperature sensor 250 is ±25 mV for the forward voltage Vf, and, if this is converted to the detected temperature, the offset error Eofs becomes 11.9° C. based on the relationship of 2.1 mV/° C. The offset error Eofs is due to systematic errors, i.e., individual unit's variation, and does not vary.

Further, if the input voltage range of the A/D conversion circuit 1208 is 3.3 V and the resolution is 10 bits, the detected temperature range is obtained by dividing the input voltage range by the forward voltage Vf after amplification, which is 157° C. (=3.3 V/21 mV/° C.). Furthermore, the resolution for quantizing the analog value to a digital value is obtained by dividing the detected temperature range by the resolution, which is in units of 0.15° C. (=157° C./1024). The A/D conversion error Ead of the A/D conversion circuit 1208 is a random error, and therefore varies depending on detection conditions and the like.

In the inspection process before shipping the print head 14, the offset error Eofs of each of the head temperature sensors 250 is detected in a state where the A/D conversion error Ead is included within the input voltage range of the predetermined A/D conversion circuit 1208. Furthermore, the detected offset error Eofs of each of the head temperature sensors 250 is held in the storage medium of the print head 14.

Therefore, in S1102, the first calibration value, which calibrates the detected temperature of each of the head temperature sensors 250 so as to be the same as the detected temperature of the head temperature sensor 250 that is the reference, is calculated from the stored offset error Eofs of each of the head temperature sensors 250 (see FIG. 13). Note that the head temperature sensor 250 that is the reference is one of the multiple head temperature sensors 250 in the print head 14 after replacement, for example, the head temperature sensor 250 that is closest to the substrate inlet ports 604 where ink flows in. The "head temperature sensor 250 that is the reference" is hereinafter referred to as the "reference head temperature sensor 250" as appropriate.

Note that the offset error Eofs of each of the head temperature sensors 250 is obtained in the detection process and held in the storage medium of the print head 14, but there is no limitation as such. For example, the offset error Eofs may be obtained before filling of the print head 14 after replacement with ink, based on the output value from each of the head temperature sensors 250 in a state where the temperature of the print head 14 is constant.

Returning to FIG. 11, the explanation is continued. Next, in S1104, the print controller 208 starts detecting the temperature of the print head 14 using the reference head temperature sensor 250. Further, in S1106, the print controller 208 starts the detecting the temperature of the ink flowing into the print head 14 using the ink temperature sensor 248. Moreover, in S1108, the print controller 208 detects the temperature of the surrounding area of the print head 14 using the environmental temperature sensor 246. Note that the order of execution of S1104, S1106, and S1108 is not limited to the sequence described above and can be in any order. Further, S1104, S1106, and S1108 may be executed simultaneously. Moreover, S1104, S1106, and S1108 may be executed in parallel with S1102. Furthermore, in S1104, S1106, and S1108, the print controller 208 continues detecting the temperatures with the respective temperature sensors at regular intervals until, for example, it is determined in the later-described S1110 that the filling of the print head 14 with ink has ended.

Next, in S1110, the print controller 208 determines whether or not the filling of the print head 14 after replacement with ink has been completed. If it is determined in S1110 that the filling of the ink has not ended, the processing returns to S1110. Further, if it is determined in S1110 that the filling of the ink has ended, the processing proceeds to S1112. In S1112, the print controller 208 obtains the detected temperatures from the respective sensors at the point in time where the filling of the ink ends (or at the detection timing closest to the timing where the filling of the ink ends). In other words, in S1112, the detected temperature Td from the reference head temperature sensor 250, the detected temperature Ti from the ink temperature sensor 248, and the detected temperature from the environmental temperature sensor 246 (the environmental temperature Te) are obtained.

After that, in S1114, the print controller 208 obtains the second calibration value using the detected temperature Td, the detected temperature Ti, and the environmental temperature Te obtained in S1112. In S1114, the calibration value is obtained using the later-described formula (4), which is based on the above-described formula (3).

$$Tadj2=\{Ti-A(Ti-Te)\}-\text{Td\_base} \tag{4}$$

Note that Tadj2 is the second calibration value, and Td base is the detected temperature from the reference head temperature sensor 250.

Once the second calibration value is obtained, the processing proceeds to S1116, and the print controller 208 adds the first calibration value and the second calibration value for each of the head temperature sensors 250, thereby obtaining the calibration value Tadj to apply, and this obtainment process ends. In this obtainment process, a unique calibration value is obtained for each of the head temperature sensors 250. The calibration values obtained by the obtainment process are associated with the corresponding head temperature sensors 250 and stored in the storage area of the print engine unit 202 or the controller unit 206, for example. Further, regarding the control using the detected temperature Td from the head temperature sensors 250, the control is executed based on the value obtained by adding the calibration value Tadj to the detected temperature Td.

Note that, in the explanation of the obtainment process described above, the detected temperatures from the reference head temperature sensor 250, the ink temperature sensor 248, and the environmental temperature sensor 246 are continuously obtained during the filling of the ink, but there is no limitation as such. For example, the detected temperatures from the reference head temperature sensor 250, the ink temperature sensor 248, and the environmental temperature sensor 246 may be obtained at the timing where it is determined that the filling of the ink has ended, and the obtained detected temperatures may be used to obtain the second calibration value from the above-described formula (4).

Here, the proportionality coefficient A is determined based on the heat transfer between the ink and the environment in a distance from the ink temperature sensor 248 to the head temperature sensor 250. Therefore, the proportionality coefficient A is different depending on the distance between the ink temperature sensor 248 and the head temperature sensor 250.

For example, the proportionality coefficient A at a position close to the inlet ports of ink into the print head 14, i.e., at a position with a relatively close distance between the ink temperature sensor 248 and the head temperature sensor 250, is 0.1. At this time, the proportionality coefficient A at a position far from the inlet ports of ink into the print head 14, i.e., at a position with a relatively far distance between the ink temperature sensor 248 and the head temperature sensor 250, is 0.5 (see FIG. 14).

Such proportionality coefficients A are measured in experiments in advance. Then, a table illustrating the relationship between the proportionality coefficient A and the position of the head temperature sensor 250 relative to the ink temperature sensor 248 is held in the storage area of the print controller 208 or the like, so that the proportionality coefficient A can be changed according to a change in the reference head temperature sensor 250.

Heat transfer (e.g., the amount of heat transferred per unit of time) between the ink and the environment (the installation environment of the print head 14) varies depending on the distance between the ink temperature sensor 248 and the head temperature sensor 250, as well as the ink flow velocity, the ink type, the member of the flow path, and the like. For this reason, the table held may be a table illustrating the relationship between the proportionality coefficient A and each condition in which the above-described distance, ink flow velocity, ink type, member of the flow path, and the like are made different and combined.

<Functional Effect>

As explained above, in the present embodiment, for each of the head temperature sensors 250, the first calibration value for the reference head temperature sensor 250 is obtained based on the offset error Eofs of each of the head temperature sensors 250 held in the storage medium of the print head 14. Further, the second calibration value for calibrating the detected temperature from the reference head temperature sensor 250 is obtained by the above-described formula (4) using the detected temperatures from the reference head temperature sensor 250, the ink temperature sensor 248, and the environmental temperature sensor 246. Then, the first calibration value and the second calibration value are added to obtain a calibration value for each of the head temperature sensors 250. Accordingly, in addition to the functional effects of the above-described first embodiment and the above-described second embodiment, it is possible to perform calibration more properly for each individual head temperature sensor 250.

Other Embodiments

Note that the above-described embodiments may be modified as shown in the following (1) through (7).

(1) Although not specifically mentioned in the above-described embodiments, the apparatus to which the present invention can be applied is not limited to a printing apparatus. The present invention can be applied to various known apparatuses that obtain a desired product by controlling based on the detected temperature from a temperature sensor with a large offset error, such as a diode sensor.

(2) In the above-described embodiments, the printing apparatus 10 is a full-line type printing apparatus, but there is no limitation as such. The printing apparatus to which the present invention can be applied may be what is termed as a serial scan type printing apparatus that ejects ink onto a print medium for printing while moving in a direction that intersects the conveyance direction of the print medium. Further, in the above-described embodiments, the printing apparatus 10 is configured with a printing function and a reading function, but there is no limitation as such. A configuration including various known functions along with a printing function and a reading function, and a configuration including a printing function only are also possible.

(3) In the above-described embodiments, the print controller 208 in the printing apparatus 10 is used to obtain a calibration value to calibrate the detected temperature from the head temperature sensors 250, but there is no limitation as such. In other words, the above-described calibration value may be obtained by an information processing apparatus connected to the printing apparatus 10, such as a general purpose personal computer or the like, using the detected temperatures of the head temperature sensors 250, the ink temperature sensor 248, and the environmental temperature sensor 246.

(4) Although not specifically mentioned in the above-described embodiments, the printing apparatus 10 may be configured to allow selection of one obtainment process from at least any two of the obtainment process according to the above-described first embodiment, the obtainment process according to the above-described second embodiment, and the obtainment process according to the above-described third embodiment. Further, although not specifically mentioned in the above-described embodiments, the new print head 14 to be replaced may be a new print head with the ink unfilled, or a used print head with the ink already filled.

(5) Although not specifically mentioned in the above-described embodiments, the circulation path 300 may be equipped with a temperature control part that controls the temperature of the circulating ink. By using a temperature control part, the ink inside the circulation path is kept constant regardless of the environmental temperature, so that the calibration value can be obtained using the above-described formula (1).

(6) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(7) The above-described embodiments and various forms shown in (1) through (6) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-139530, filed Aug. 30, 2023, which is hereby incorporated by reference wherein in its entirety.

What is claimed is:

1. A printing apparatus comprising:

a printing unit configured to perform printing onto a print medium;

a supply unit configured to supply ink to the printing unit;

a first detection unit configured to detect a temperature of the ink to be supplied to the printing unit;

a second detection unit configured to detect a temperature of the printing unit; and an obtainment unit configured to obtain a first calibration value based on a value obtained by subtracting a second detected temperature from the second detection unit from a first detected temperature from the first detection unit of the ink upstream of the printing unit, the first calibration value being obtained for calibrating the second detected temperature.

2. The printing apparatus according to claim 1, wherein the printing unit is equipped with a substrate capable of ejecting the ink using energy generated by a printing element, and the second detection unit is a temperature detecting element installed on the substrate.

3. The printing apparatus according to claim 2, wherein a plurality of the temperature detecting elements is installed.

4. The printing apparatus according to claim 1 further comprising a third detection unit configured to detect an environmental temperature, wherein the obtainment unit obtains the first calibration value based on the first detected temperature, the second detected temperature, and a third detected temperature from the third detection unit.

5. The printing apparatus according to claim 4, wherein, if the first calibration value is Tadj, the first detected temperature is Ti, the second detected temperature is Td, the third detected temperature is Te, and a proportionality coefficient that is proportional to a heat transfer rate between the ink and an environment is A, the obtainment unit obtains the first calibration value using the following formula:

$$Tadj = \{Ti - A(Ti - Te)\} - Td.$$

6. The printing apparatus according to claim 4, wherein the printing unit is equipped with a substrate capable of ejecting the ink using energy generated by a printing element, wherein the substrate is equipped with a plurality of temperature detecting elements as the second detection unit, and wherein the obtainment unit obtains a second calibration value for calibrating a detected temperature from a temperature detecting element other than a temperature detecting element that is a reference among the plurality of temperature detecting elements to a detected temperature from the temperature detecting element that is the reference, and a third calibration value for calibrating the detected temperature from the temperature detecting element that is the reference, based on the detected temperature from the temperature detecting element that is the reference, the first detected temperature, and the third detected temperature, and obtains the first calibration value for each of the plurality of temperature detecting elements by adding the second calibration value and the third calibration value.

7. The printing apparatus according to claim 6, wherein, if the third calibration value is Tadj2, the first detected temperature is Ti, the detected temperature from the temperature detecting element that is the reference is Td_base, the third detected temperature is Te, and a proportionality coefficient that is proportional to a heat transfer rate between the ink and an environment is A, the obtainment unit obtains the third calibration value using the following formula:

$$Tadj2 = \{Ti - A(Ti - Te)\} - \text{Td\_base}.$$

8. The printing apparatus according to claim 6, wherein the temperature detecting element that is the reference is, among of the plurality of temperature detecting elements, the temperature detecting element which is closest to an inlet port through which the ink flows into the substrate.

9. The printing apparatus according to claim 7, wherein the proportionality coefficient A changes according to the distance from an inlet port through which the ink flows into the substrate to the temperature detecting element that is the reference.

10. The printing apparatus according to claim 1 further comprising a circulation path configured to be capable of circulating ink by supplying ink to the printing unit and collecting ink from the printing unit.

11. The printing apparatus according to claim 1 further comprising a temperature control unit configured to control the temperature of the ink supplied to the printing unit.

12. The printing apparatus according to claim 1, wherein the supply of ink to the printing unit by the supply unit is the filling of the printing unit after replacement with ink, and a timing of the detection of the first detected temperature and the second detected temperature is a timing after the filling ends.

13. An information processing method comprising obtaining a first calibration value based on a first detected temperature detected by a first detection unit, which is configured to detect a temperature of ink to be supplied to an ejection unit configured to eject ink, and a second detected temperature detected by a second detection unit, which is configured to detect a temperature of the ejection unit, the first calibration value being obtained for calibrating the second detected temperature.

14. The information processing method according to claim 13, wherein, in the obtaining, the first calibration value is obtained based on the first detected temperature, the second detected temperature, and a third detected temperature detected by a third detection unit configured to detect an environmental temperature.

15. The information processing method according to claim 14, wherein, in the obtaining, a second calibration value is obtained for calibrating a detected temperature from a temperature detecting element other than a temperature detecting element that is a reference among a plurality of temperature detecting elements that constitute the second detection unit to a detected temperature from the temperature detecting element that is the reference, and a third calibration value is obtained for calibrating the detected temperature from the temperature detecting element that is the reference, based on the detected temperature from the temperature detecting element that is the reference, the first detected temperature, and the third detected temperature, and the first calibration value is obtained for each of the plurality of temperature detecting elements by adding the second calibration value and the third calibration value.

16. A non-transitory computer readable storage medium storing a program for causing a computer to function as an information processing apparatus, the information processing apparatus comprising:

an obtainment unit configured to obtain a first calibration value based on a first detected temperature detected by a first detection unit, which is configured to detect a temperature of ink to be supplied to an ejection unit configured to eject ink, and a second detected temperature detected by a second detection unit, which is configured to detect a temperature of the ejection unit, the first calibration value being obtained for calibrating the second detected temperature.

* * * * *